United States Patent
Lim

(10) Patent No.: US 9,879,901 B2
(45) Date of Patent: Jan. 30, 2018

(54) REFRIGERATOR

(71) Applicant: LG ELECTRONICS INC., Seoul (KR)

(72) Inventor: Kiyoung Lim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 12 days.

(21) Appl. No.: 15/017,404

(22) Filed: Feb. 5, 2016

(65) Prior Publication Data

US 2016/0273825 A1    Sep. 22, 2016

(30) Foreign Application Priority Data

Mar. 18, 2015  (KR) .................. 10-2015-0037688
Mar. 18, 2015  (KR) .................. 10-2015-0037689

(51) Int. Cl.
*A47B 96/04*  (2006.01)
*F25D 23/02*  (2006.01)
(Continued)

(52) U.S. Cl.
CPC ............. *F25D 23/028* (2013.01); *E05D 7/00* (2013.01); *E05D 11/00* (2013.01); *E05F 1/00* (2013.01);
(Continued)

(58) Field of Classification Search
CPC .................................. F25D 25/02; F25D 23/04
(Continued)

(56) References Cited

U.S. PATENT DOCUMENTS 8,322,805 B2 *  12/2012  Kwon ................... F25D 23/025
                                              312/275
8,944,534 B2 *   2/2015  Lim ...................... F25D 23/028
                                              312/292
(Continued)

FOREIGN PATENT DOCUMENTS

EP      2 594 879       5/2013
EP      2 677 258      12/2013
(Continued)

OTHER PUBLICATIONS

Korean Notice of Allowance dated Jun. 22, 2016 issued in Application No. 10-2015-0037689 (English translation attached).
European Search Report dated Jul. 27, 2016 issued in Application No. 16154211.3.
Korean Notice of Allowance dated Oct. 24, 2016 issued in Application No. 10-2015-0037688.

*Primary Examiner* — Matthew W Ing
(74) *Attorney, Agent, or Firm* — KED & Associates, LLP

(57) ABSTRACT

A refrigerator may include a main door pivotably mounted to the cabinet to allow access to a storage compartment, the main door having an opening for an auxiliary storage compartment; a sub door pivotably mounted to the main door; a support shelf having at least one rotating shaft pivotably mounted at a lower vicinity of the opening; a case mounted in a recess formed in the main door, the case having an opening through which a slider slides, and a rotating gear provided with a pinion and coupled to the at least one rotating shaft. The slider includes a rack engaged with the pinion such that a movement of the sub door to close the auxiliary compartment rotates the support shelf to a vertical position, and a movement of the sub door to open the auxiliary compartment rotates the support shelf to a horizontal position.

28 Claims, 18 Drawing Sheets

(51) Int. Cl.
  *F25D 25/02* (2006.01)
  *E05F 15/53* (2015.01)
  *E05D 7/00* (2006.01)
  *E05D 11/00* (2006.01)
  *E05F 1/00* (2006.01)
  *F25D 23/04* (2006.01)
  *F25D 23/06* (2006.01)

(52) U.S. Cl.
  CPC ............ *E05F 15/53* (2015.01); *F25D 23/025* (2013.01); *F25D 23/04* (2013.01); *F25D 23/062* (2013.01); *F25D 23/067* (2013.01); *F25D 25/027* (2013.01)

(58) Field of Classification Search
  USPC ............ 312/309, 310, 401, 405, 405.1, 408
  See application file for complete search history.

(56) References Cited

U.S. PATENT DOCUMENTS

| | | | |
|---|---|---|---|
| 8,960,826 B2* | 2/2015 | Choo | F25D 23/04 312/310 |
| 2006/0226750 A1* | 10/2006 | Lee | F25D 23/02 312/405.1 |

FOREIGN PATENT DOCUMENTS

| | | |
|---|---|---|
| KR | 10-2005-0003865 | 1/2005 |
| KR | 10-2007-0019217 | 2/2007 |
| KR | 10-2010-0066865 | 6/2010 |
| KR | 10-2010-0130509 | 12/2010 |
| KR | 10-2013-0052092 | 5/2013 |
| KR | 10-2014-0116595 | 10/2014 |
| WO | WO 2016/060531 | 4/2016 |

* cited by examiner

REFRIGERATOR

CROSS-REFERENCE TO RELATED APPLICATION

This application claims priority under 35 U.S.C. §119 to Korean Patent Application Nos. 10-2015-0037688 and 10-2015-0037689, both filed on Mar. 18, 2015, whose entire disclosure are hereby incorporated by reference.

BACKGROUND

1. Field

The present disclosure relates to a refrigerator and, more particularly, to a refrigerator including a sub door pivotably mounted to a main door.

2. Background

A refrigerator is an apparatus in which cold air, generated via a refrigeration cycle consisting of, for example, a compressor, a condenser, an expansion valve, and an evaporator, is supplied into a storage compartment to keep food stored in the storage compartment at freezing or less or at a temperature slightly above freezing. A typical refrigerator internally defines storage compartments including a freezing compartment in which foods or beverages are kept frozen and a refrigerating compartment in which foods or beverages are kept cold.

Refrigerators may be divided, based on the arrangement of a freezing compartment and a refrigerating compartment. Examples of different types of refrigerators are a top mounting type refrigerator in which a freezing compartment is located above a refrigerating compartment, a bottom freezer type refrigerator in which a freezing compartment is located below a refrigerating compartment, and a side by side type refrigerator in which a freezing compartment and a refrigerating compartment are divided into left and right sides.

In recent years, large refrigerators having large storage capacities have been released. In order to efficiently utilize a receiving space, door shelves and receiving cases are provided inside a refrigerating compartment door so as to define a space to place items to be stored. A receiving case, which is a space that is provided inside a door, separately from a storage compartment, is referred to as a home bar or an auxiliary storage compartment.

In order to enable access to the auxiliary storage compartment without opening the door to open the entire refrigerating compartment, the refrigerating compartment door may be provided with an opening, and a sub door may be mounted to open or close the opening. The door to open or close the interior of the refrigerating compartment may be called a main door, and the door to open or close the auxiliary storage compartment door may be called a sub door.

The sub door may have substantially the same size as the main door, or may be smaller than the main door. The sub door may be mounted so as to be pivotable upward and downward about a horizontal axis, or may be mounted so as to be pivotable leftward or rightward about a vertical axis.

A user may access the auxiliary storage compartment through an opening formed in the main door by opening only the sub door, thereby introducing or retrieving beverages or foods into or from the auxiliary storage compartment. However, since the refrigerator has no structure capable of supporting, for example, foods when the user opens the sub door and retrieves beverages or foods, the user must inconveniently move the retrieved foods to another place such as, for example, a table or a sink.

BRIEF DESCRIPTION OF THE DRAWINGS

The embodiments will be described in detail with reference to the following drawings in which like reference numerals refer to like elements wherein.

DETAILED DESCRIPTION OF THE DISCLOSURE

Figure 1:
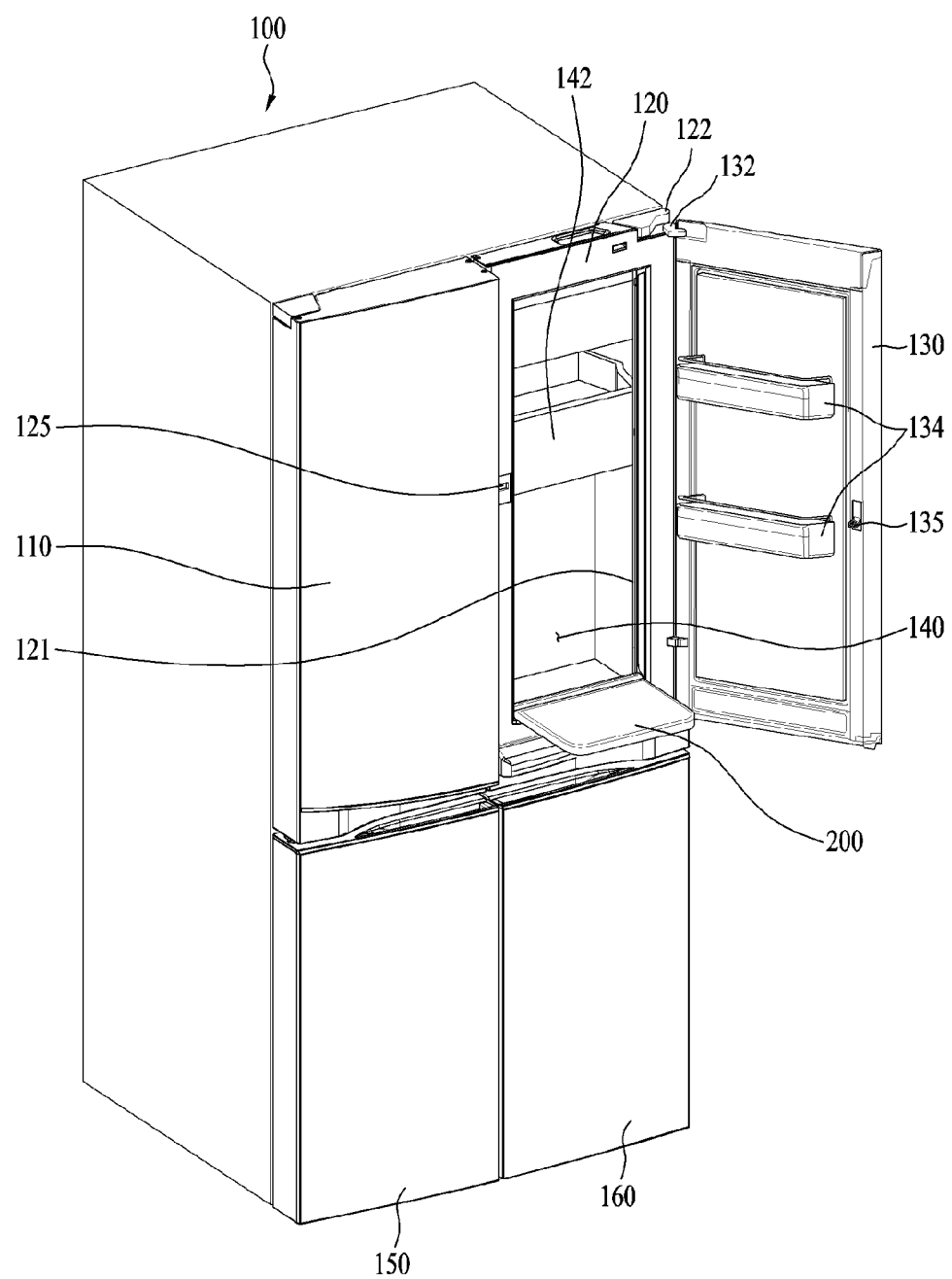
FIG. 1 is a perspective view illustrating a refrigerator according to an exemplary embodiment of the present disclosure.
Figure 2:
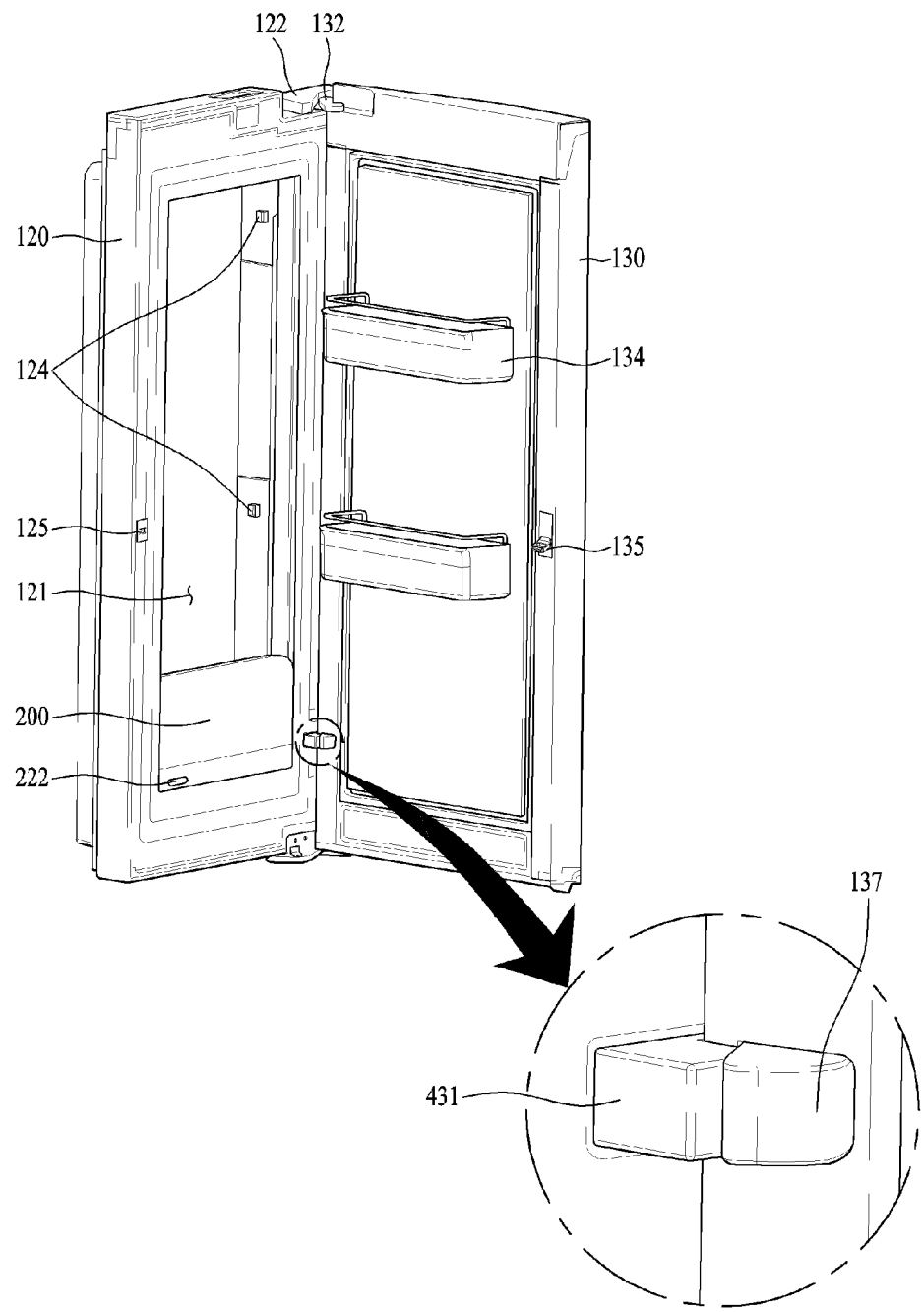
FIG. 2 is a perspective view illustrating a main door and a sub door, which are used to open or close a refrigerating compartment at the right side of FIG. 1.

FIG. 1 is a perspective view illustrating a refrigerator according to an exemplary embodiment of the present disclosure, and FIG. 2 is a perspective view illustrating a main door and a sub door, which are used to open or close a refrigerating compartment at the right side of FIG. 1. The illustrated refrigerator is a bottom freezer type refrigerator in which a storage compartment inside a cabinet 100 includes an upper refrigerating compartment and a lower freezing compartment. It will be appreciated that the present disclosure is not limited to this type of refrigerator and may be applied to other refrigerators so long as they include a main door and a sub door, which are pivoted to open or close the storage compartment.

In the illustrated embodiment, as doors to open or close the refrigerating compartment, a left refrigerating compartment door 110 and a right refrigerating compartment door 120 and 130 are pivotably mounted respectively. The right refrigerating compartment door includes a main door 120 to open or close the refrigerating compartment at the right side and a sub door 130 pivotably mounted to the main door 120.

The main door 120 is pivotably mounted to the cabinet 100 by a hinge 122, and the sub door 130 is pivotably mounted to the main door 120 by a hinge 132. The main door 120 is centrally provided with an opening 121, and an auxiliary storage compartment 140 is defined behind a rear surface of the main door 120. The sub door 130 is configured to open or close the auxiliary storage compartment 140. As exemplarily illustrated in FIG. 1, the auxiliary storage compartment 140 is a storage space separated from the interior space of the refrigerating compartment. One or more baskets 142 may be mounted in the auxiliary storage compartment 140.

As exemplarily illustrated in FIG. 2, the baskets 134 may be mounted to basket hooks 124 protruding from an inner side surface of a door dike provided at the main door 120. A plurality of baskets 134 may also be mounted to a rear surface of the sub door 130. The baskets 134 are located inside the opening 121 of the main door 120 when the sub door 130 is closed.

A hook 135 may be mounted at one side of the rear surface of the sub door 130 and may be configured so as to be inserted into a latch recess 125 formed in one side of a front surface of the main door 120. The hook 135 may be pivoted upward or downward at a prescribed angle by a user in a mechanical or electronic manner so as to be caught by or released from the latch recess 125. Alternatively, the hook 135 may be immovably secured to the sub door 130, and a latch configured to be operated by the user may be provided inside a latch device.

When the user pulls the sub door 130 in a state in which the hook 135 is caught by the latch recess 125, the main door 120 and the sub door 130 are pivoted while being coupled to each other. When the user releases the hook 135 from the latch recess 125 and then pulls the sub door 130, only the sub door 130 is pivoted to allow the user to access the auxiliary storage compartment 140.

In some cases, a refrigerating compartment door may include a main door and a sub door, and the main door and the sub door may have a width corresponding to a width of the cabinet 100, rather than being divided into left and right parts, and may be pivotably mounted. Door to open or close the freezing compartment includes a left freezing compartment door 150 and a right freezing compartment door 160. The freezing compartment door may include a single door which is pivotably mounted, or may include a drawer type door which is pulled out or pushed into the freezing compartment.

As exemplarily illustrated in FIG. 2, a protrusion 431 of a power transmission device (400, see FIG. 4), which will be described below, protrudes from a right lower portion of the front surface of the main door 120. The power transmission device is mounted so as to be received in the main door 120 and only the protrusion 431 protrudes from the front surface of the main door 120.

The sub door 130 is provided with a protrusion 137 at the rim portion of the rear surface thereof at which the hinge 132 is provided. When the sub door 130 is closed, the protrusion 137 at the sub door 130 pushes the protrusion 431 to operate the power transmission device. In turn, the power transmission device pivots a rotating shaft of a support unit 200 so that the support unit 200 is pivoted to a vertically oriented position. The support unit or a support shelf 200 is provided in a lower surface thereof with a shaft movement hole 222 to allow the rotating shaft, which protrudes from the left side of the support unit 200, to move into a rotating shaft receiving space.

Detailed configurations of the power transmission device and the support unit will be described below. A configuration in which the power transmission device is mounted in a mounting recess formed in the rear surface of the main door will be described below with reference to FIGS. 3 to 5.

Figure 3:
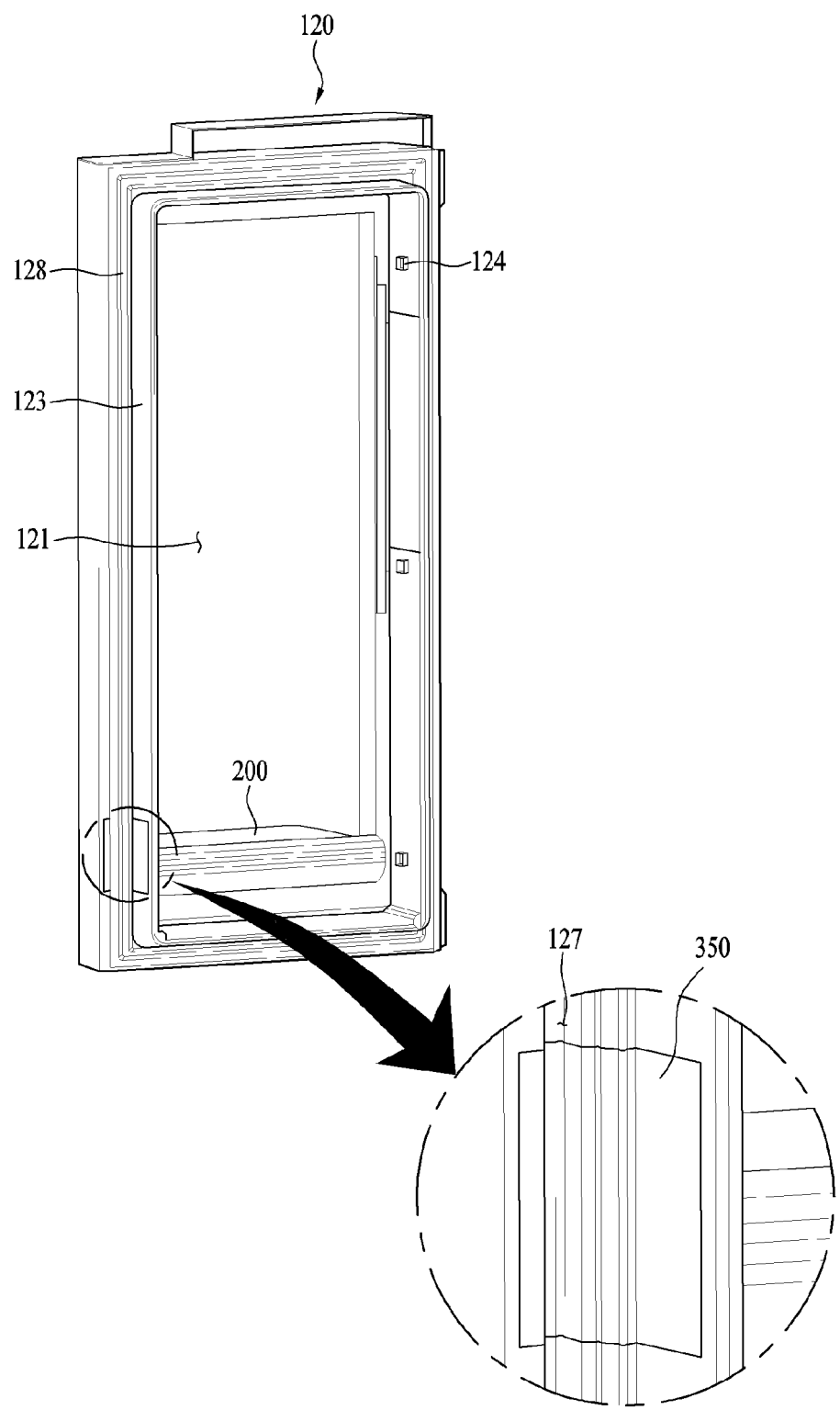
FIG. 3 is a perspective view illustrating the main door viewed from the rear surface side.

FIG. 3 illustrates a configuration in which the cover 350 is mounted to cover the mounting recess 300 (FIG. 4) and the gasket 128 is mounted over the cover 350 so as to cover a middle portion of the cover 350. The main door 120, which generally has a rectangular shape, is provided at the edge of the rear surface thereof with a gasket 128. The gasket 128 comes into close contact with a front surface of the cabinet 100 so as to prevent leakage of cold air when the main door 120 is closed.

In addition, a door dike 123 may protrude rearward from the main door 120 inside the gasket 128, and the basket hooks 124 for the mounting of baskets may protrude from an inner side surface of the door dike 123. Although the gasket 128 is not illustrated in the enlarged view of FIG. 3, a protruding rib of the gasket 128 may be inserted into and mounted in a gasket groove 127 formed in the edge of the rear surface of the main door 120.

Figure 4:
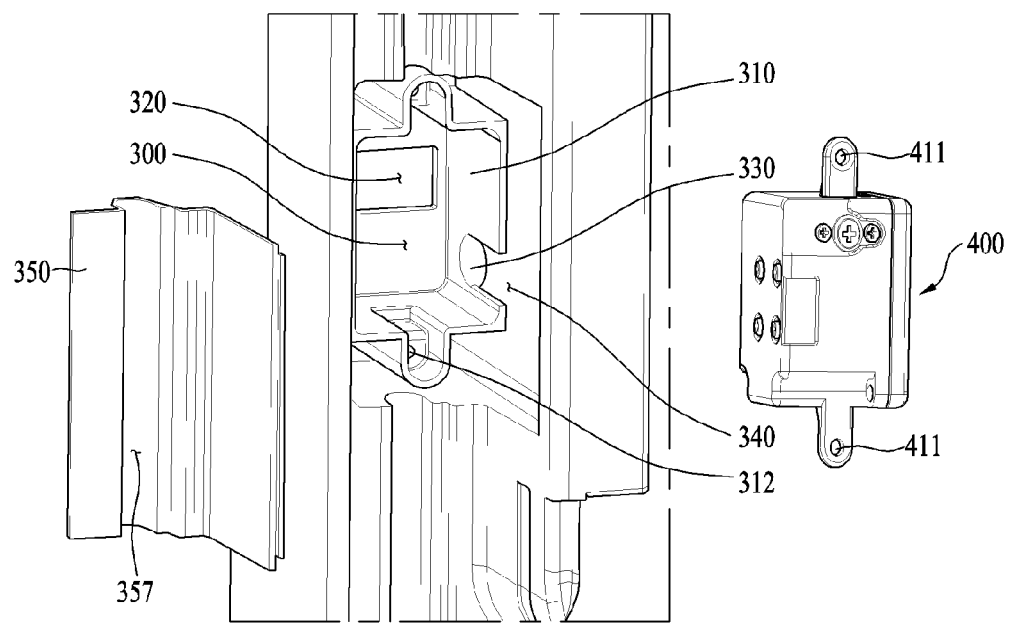
FIG. 4 is a partial perspective view illustrating a power transmission device mounted in a mounting recess provided in a rear surface of the main door and a cover for covering the power transmission device.
Figure 5:
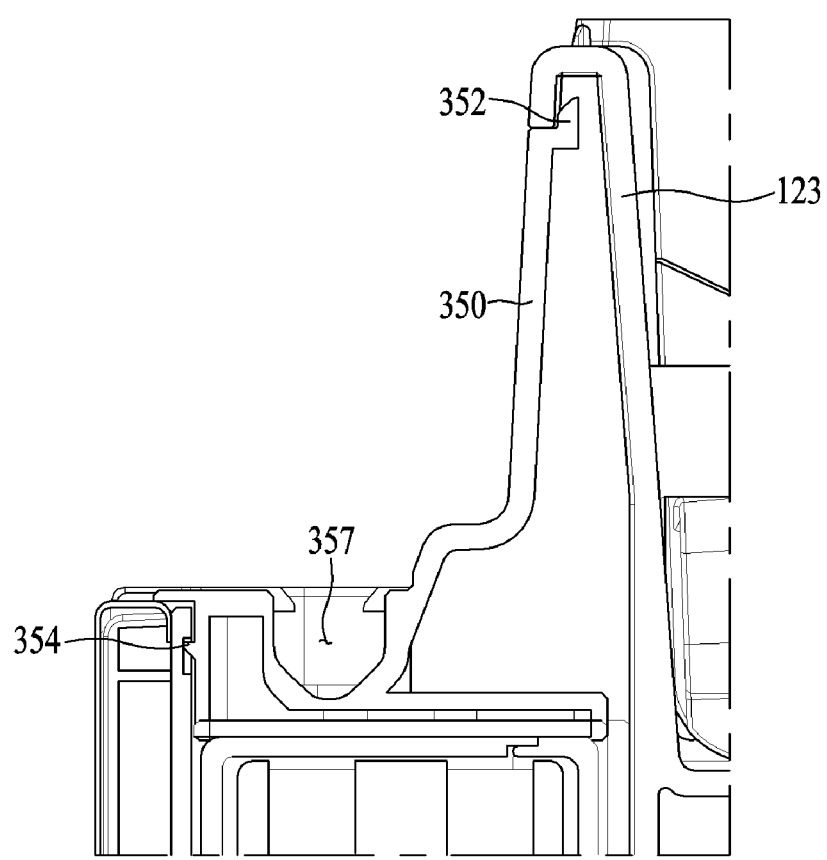
FIG. 5 is a partial sectional view taken along a horizontal plane illustrating the region at which the cover of FIG. 4 is mounted.

As illustrated in FIG. 4, the main door 120 includes a mounting recess 300 formed in an edge of the rear surface thereof such that the power transmission device is inserted into and mounted in the mounting recess 300, and a cover 350 to cover the mounting recess 300. The power transmission device 400 is inserted into and mounted in the mounting recess 300, which is formed in the rear surface of the main door 120, and the cover 350 is shaped to be continuously connected to the periphery of the mounting recess 300 and covers the power transmission device 400.

As illustrated in FIG. 4, since the cover 350 is also provided with a gasket groove 357 (FIG. 5) connected to the gasket groove 127, the protruding rib of the gasket 128 is inserted into and mounted in not only the gasket groove 127 of the main door 120, but also the gasket groove 357 of the cover 350.

A shaft hole 330, into which the rotating shaft provided at one side of the support unit 200 is inserted, is perforated through a wall surface between the opening 121 formed in the main door 120 and a side surface of the mounting recess 300. The rotating shaft of the support unit 200, as will be described below, protrudes outward through the shaft hole 330, and an end of the rotating shaft is inserted into and connected to the power transmission device or module 400. The mounting recess 300 may include a housing 310 having an open rear side, into which the power transmission device 400 is inserted and mounted.

As illustrated in FIG. 4, the power transmission device 400 may have a rectangular outer shape overall, and may be provided at upper and lower surfaces thereof with vertically extending fastening portions 411. The housing 310 having the open rear side may have a rectangular shape overall, and may be provided in upper and lower portions thereof with fastening holes 312, into which the fastening portions or couplers 411 of the power transmission device 400 are inserted and fastened.

The mounting recess 300 formed in the main door 120 is provided at a front side thereof with a through-hole 320, through which the protrusion 431 of the power transmission device 400 passes. The through-hole 320 may have a rectangular shape so as to correspond to a shape of the protrusion 431.

Figure 8A:
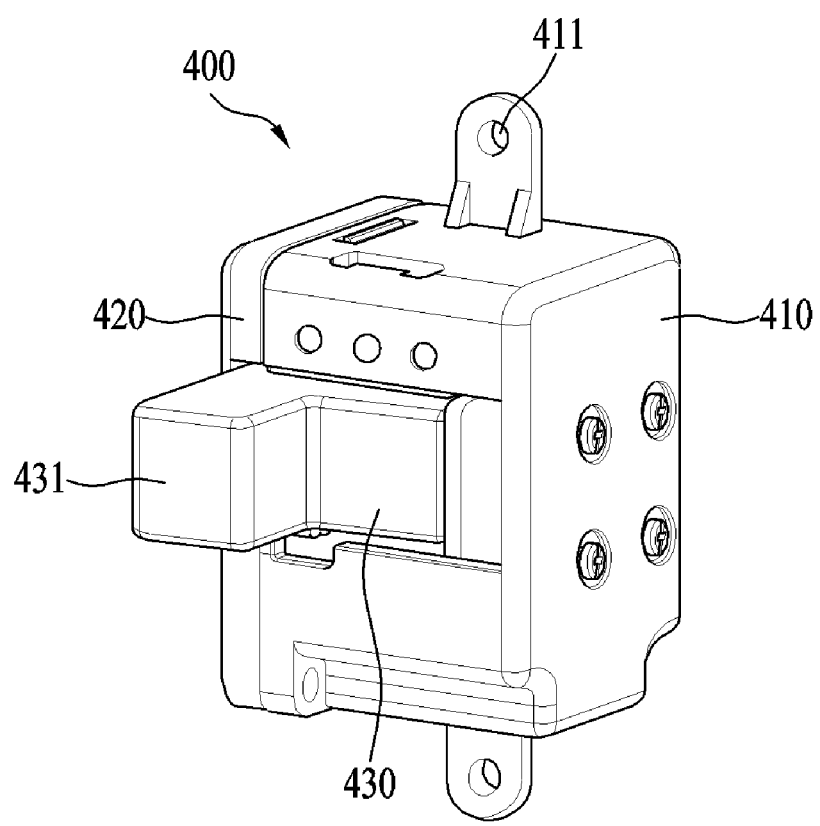
FIGS. 8A and 8B are perspective views illustrating the exterior and the interior of the power transmission device respectively.
Figure 8B:
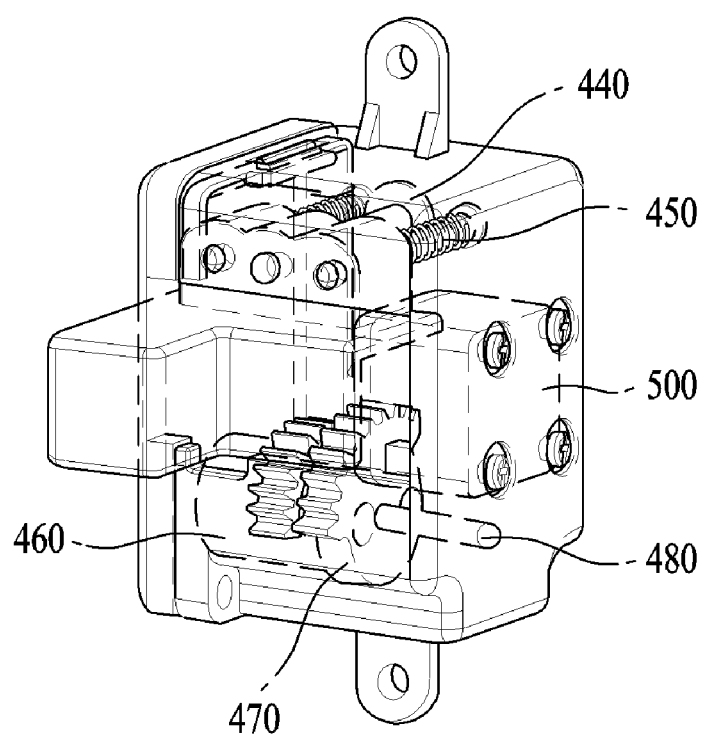
Figure 9A:
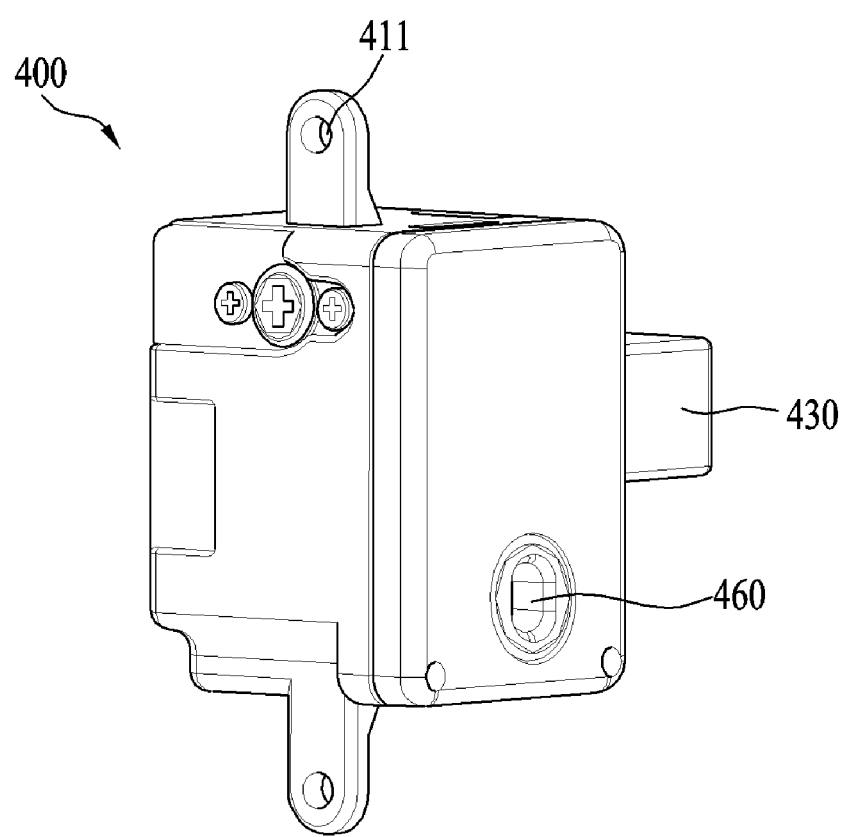
FIGS. 9A and 9B are perspective views illustrating the power transmission device of FIGS. 8A and 8B viewed in the opposite direction.
Figure 9B:
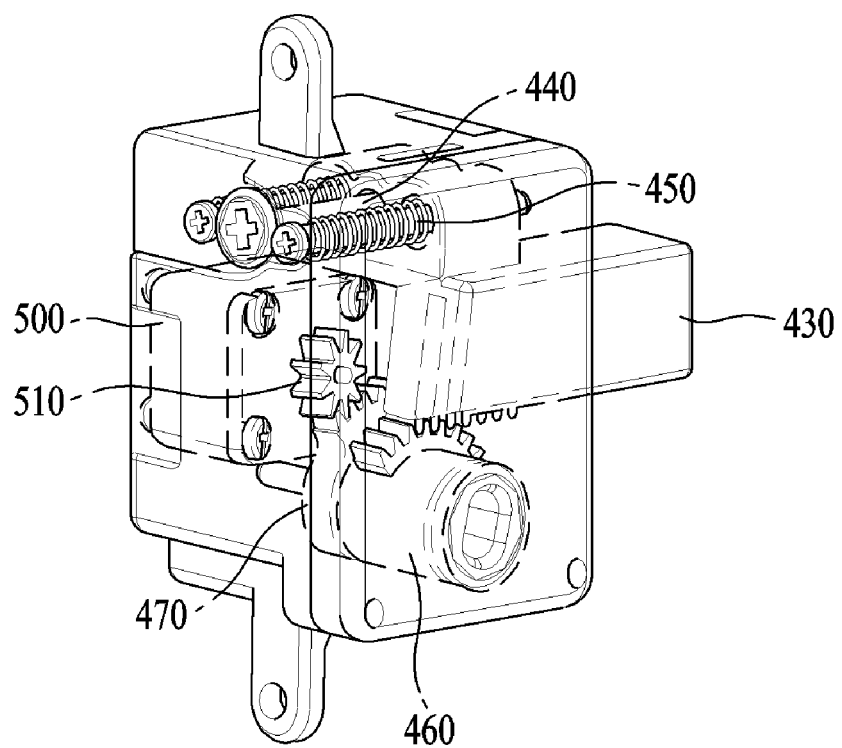
Figure 10:
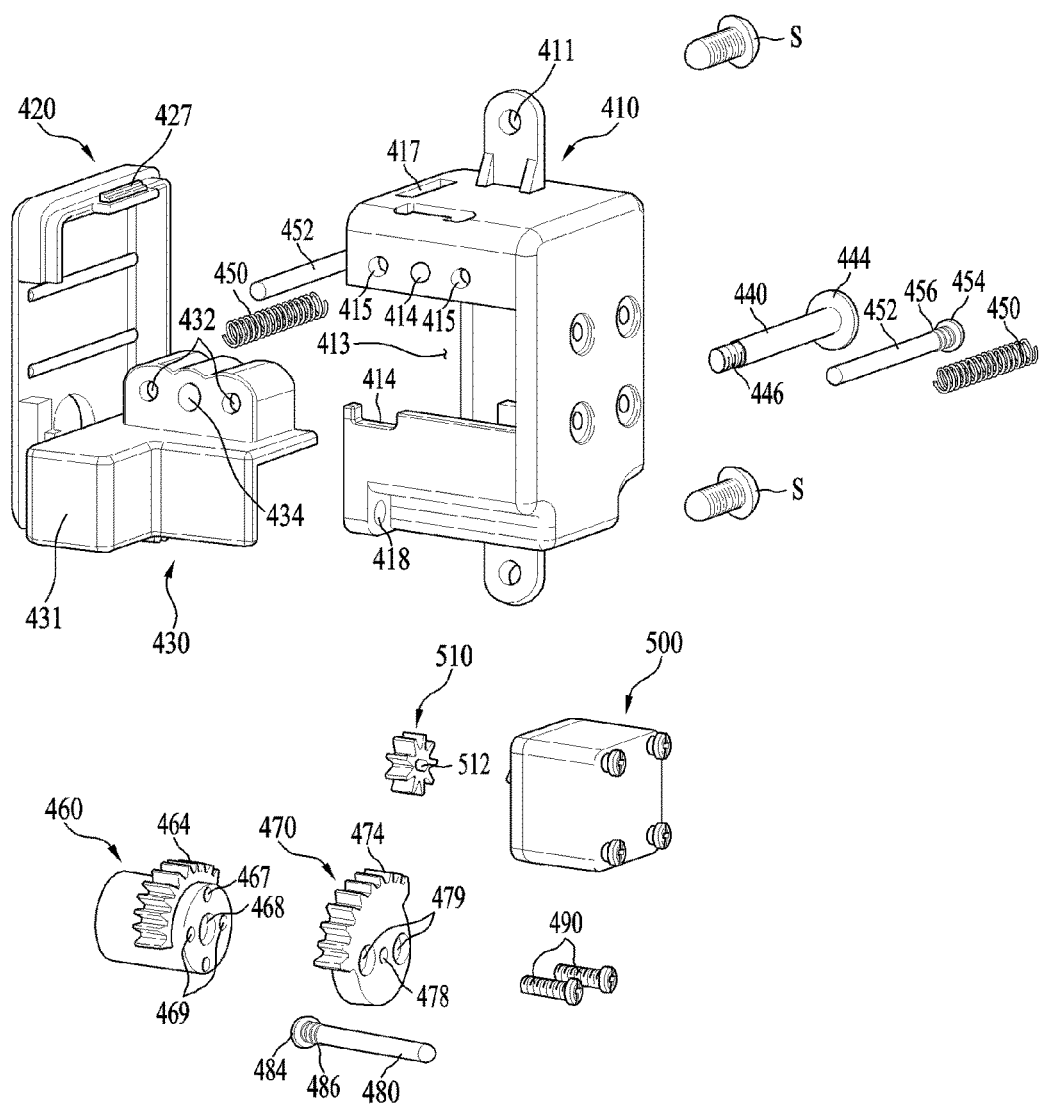
FIG. 10 is an exploded perspective view illustrating the power transmission device.
Figure 11:
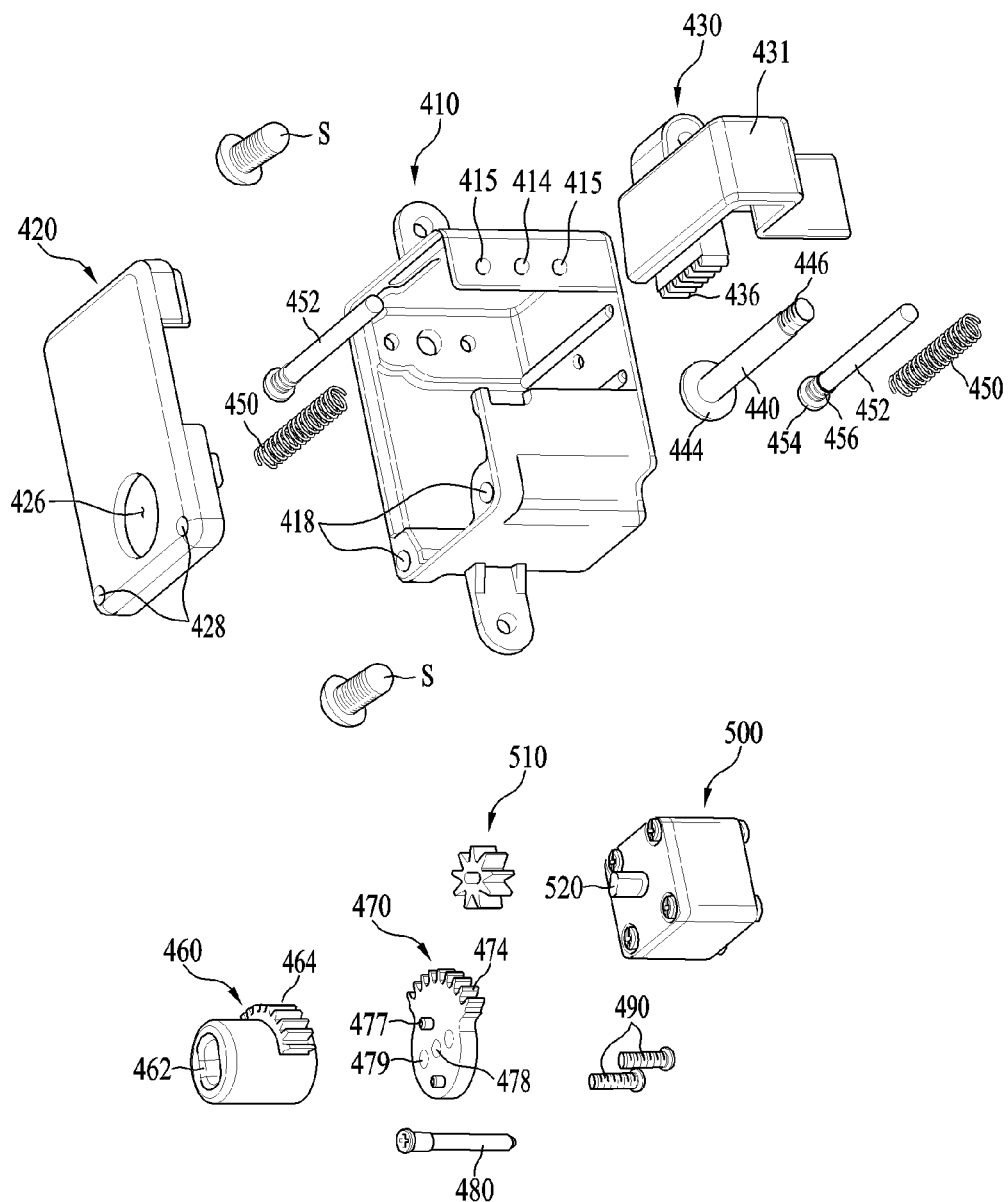
FIG. 11 is an exploded perspective view illustrating the power transmission device of FIG. 10 viewed in a different direction.

The housing 300 may be provided at a side surface thereof with a guide recess 340, which is cut from a rear end of the housing 300 to the shaft hole 330. When the power transmission device 400 is inserted, a rotating gear (460, see FIG. 8) is mounted in the guide recess 340 such that part of an end of the rotating gear 460 protrudes outward, whereby the guide recess 340 serves to guide the end of the rotating gear 460.

One of two rotating shafts of the support unit 200 is inserted into and connected to the rotating gear 460 of the power transmission device 400, and a detailed configuration of the rotating gear 460 will be described below. The rotating gear 460 is rotatably mounted in a case of the power transmission device 400, and the end of the rotating gear 460 may slightly protrude from a surface of the case.

When the power transmission device 400 is inserted into the housing 300, the absence of the guide recess 340 may cause the end of the rotating gear 460 to be caught by a rear end corner of the housing 300. Since the guide recess 340 corresponding to the protruding end of the rotating gear 460 is formed in a sidewall of the housing 300, the rotating gear 460 may be smoothly inserted to a position at which the shaft hole 330 is formed when the power transmission device 400 is inserted into the housing 310.

The cover 350 may include a first wedge 352, which is formed at one end of the cover 350 so as to be inserted into and caught by the door dike 123 of the main door 120 within the mounting recess 300, and a second wedge 354, which protrudes outward from an opposite side surface of the cover 350 so as to be inserted into a retaining recess formed in an inner side surface of the main door 120. The mounting recess 300 may be formed so as to be cut from the inside of the side surface of the main door 120 to a portion of the door dike 123.

As a method of coupling the cover 350 to the mounting recess 300, fastening holes may be formed in the cover 350 and a side surface of the mounting recess 300 facing the door dike 123 so that screws are fastened through the fastening holes. In this case, the screws are exposed to the rear surface of the main door 120, which may deteriorate the appearance of the main door 120. By providing the wedges, configured to be caught inside the mounting recess 300, at both sides of the cover 350, the cover 350 may be mounted without additional elements that are exposed outward.

The first wedge 352 may extend in a bent rib form from a right end of the cover 350 so as to be caught inside a cut end of a side surface of the door dike 123. The second wedge 354 may protrude from an outer surface of a sidewall, which extends rearward from a rear surface near a left end of the cover 350. The second wedge 354 may be inserted into and mounted in the retaining recess formed in the inner side surface of the mounting recess 300. The second wedge 354 may have an inclined lower surface.

The cover 350 may be mounted by first fitting the first wedge 352, and then pushing the left side of the cover 350 provided with the second wedge 354 rearward. Since the lower surface of the first wedge 352 is inclined, a sidewall portion provided with the second wedge 354 may be elastically deformed so as to allow the second wedge 354 to be smoothly inserted into the retaining recess.

With the mounting configuration of the power transmission device according to the present disclosure, the power transmission device may be easily and accurately mounted in the mounting recess formed in the rear surface of the main door and is barely exposed to the front surface and the rear surface of the main door, and the cover configured to cover the mounting recess is covered with the gasket. In this way, the front surface and the rear surface of the main door may have aesthetic outer appearance.

As described above, the power transmission device 400 is operated by the pivoting of the sub door 130. When the sub door 130 is closed, the power transmission device 400 rotates the rotating shaft of the support unit 200 such that the support unit 200 is vertically oriented. When the sub door 130 is opened, the power transmission device 400 rotates the rotating shaft of the support unit 200 such that the support unit 200 is horizontally oriented.

Figure 6:
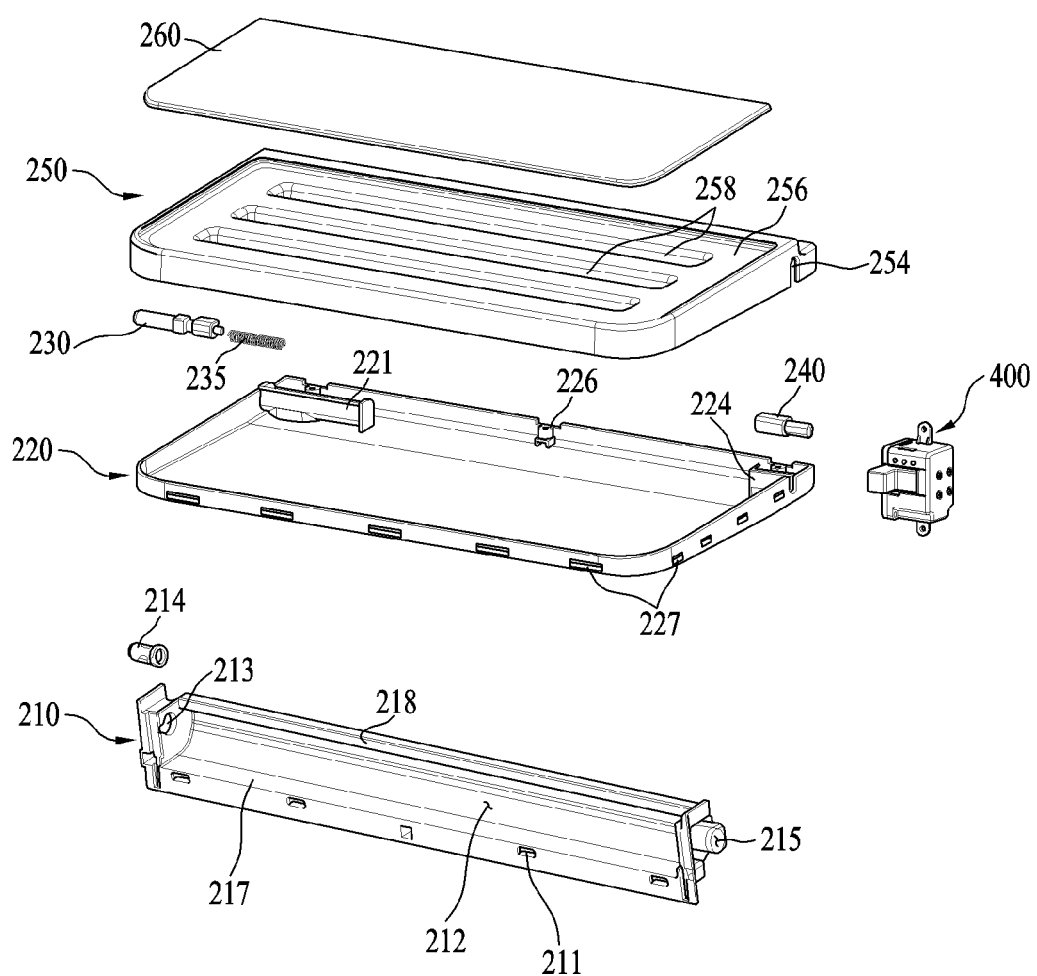
FIG. 6 is an exploded perspective view illustrating a support unit.

FIG. 6 is an exploded perspective view illustrating the power transmission device 400 and the support unit 200. The support unit 200 includes a plate or a shelf having a rectangular shape overall, and a first rotating shaft 230 and a second rotating shaft 240 which protrude laterally from both side surfaces of the plate.

The plate of the support unit 200 may include a lower case 220 provided at both side portions thereof with a first shaft mounting portion or recess 221 and a second shaft mounting portion or groove 224, which receive the first rotating shaft 230 and the second rotating shaft 240 respectively, and an upper case 250 coupled to the top of the lower case 220.

A plurality of fastening bosses 226 may be formed at the rear side of the lower case 220 so as to allow the lower case 220 to be fastened to the upper case 250 via screws. The upper case 250 may be provided at a rear end thereof with a plurality of fastening holes at positions corresponding to the fastening bosses 226.

The lower case 220 may have an upwardly extending rim portion or a flange, and the upper case 250 may include a downwardly extending rim portion or flange. A rim portion of the upper case 250 may be larger than the rim portion of the lower case 220 so as to be fitted around the rim portion of the lower case 220. A plurality of coupling recesses 227 may be formed in a front surface and both side surfaces of the rim portion of the lower case 220, and a plurality of coupling bosses or protrusions configured to be inserted into the coupling recesses 227 may be formed in a front surface and both side surfaces of the rim portion of the upper case 250.

The first shaft mounting portion 221 may be located close to a rear end of the lower case 220 so as to come into contact with the left rim portion, and the left rim portion may be provided with a bearing groove into which the first rotating shaft 230 is mounted to slide leftward and rightward. The second shaft mounting portion 224 may be located close to the rear end of the lower case 220 so as to come into contact with the right rim portion, and the right rim portion may be provided with a bearing groove into which the second rotating shaft 240 is mounted.

The upper case 250 may be provided at both sides of the rim portion thereof with bearing grooves 254, which correspond to the two bearing grooves of the lower case 220. The two bearing grooves 254 of the upper case 250 support the first rotating shaft 230 and the second rotating shaft 240 at the upper side thereof.

The first shaft mounting portion 221 is longer than the first rotating shaft 230 to enable the leftward and rightward movement of the first rotating shaft 230, unlike the second shaft mounting portion 224. As exemplarily illustrated in FIG. 2, the shaft movement hole 222 may be perforated through a lower surface of the first shaft mounting portion 221.

An elastic member 235 may be mounted in the first shaft mounting portion 221 at a position between one side of the first shaft mounting portion 221 and the first rotating shaft 230. The elastic member 235 applies restoration force in a direction in which one end of the first rotating shaft 230 protrudes from a left side surface of the lower case 220.

Figure 7A:
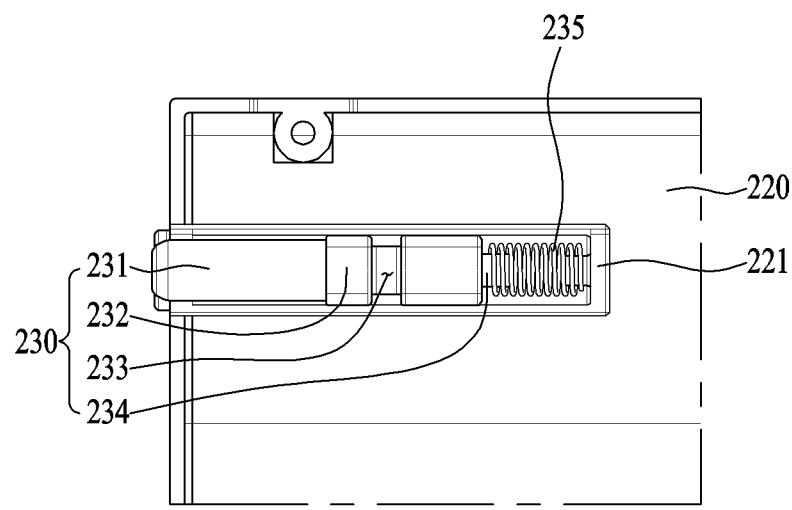
FIGS. 7A and 7B are plan views illustrating the movement of a first rotating shaft of the support unit upon mounting thereof.
Figure 7B:
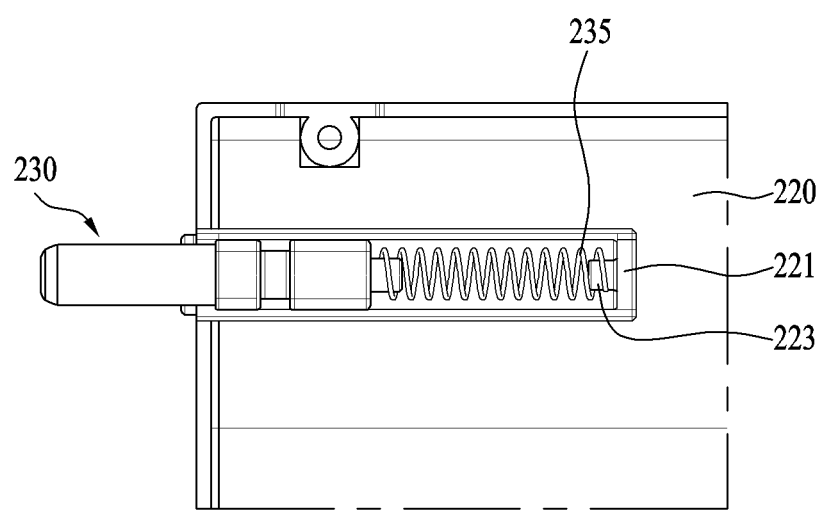

As exemplarily illustrated in FIGS. 7A and 7B, the elastic member 235 may be a spring, and may be mounted between a support boss 234 provided at a right end of the first rotating shaft 230 and a support boss 223 provided at a right side surface of the first shaft mounting portion 221. A width of the opening 121 formed in the main door 120 is greater than a width of the support unit 200, but is less than a distance between a left end of the first rotating shaft 230 and a right end of the second rotating shaft 240.

Although the support unit 200 cannot be mounted in the opening 121 when both the first rotating shaft 230 and the second rotating shaft 240 are immovably mounted, the support unit 200 having the rotating shafts 230 and 240 protruding in opposite directions may be easily mounted in the opening 121 because the first rotating shaft 230 may be inserted into the lower case 220 so as not to protrude from the side surface of the lower case 220.

The first rotating shaft 230 may include a shaft portion 231 (left shaft end) which selectively protrudes from one side surface of the support unit 200 and a sliding portion 232 (or a guide ring which may be integral with the shaft) which is slidably mounted in the first shaft mounting portion 221. The first shaft mounting portion 221 may have a rectangular cross sectional shape overall, and correspondingly, the first rotating shaft 230 may have a rectangular cross sectional shape. As such, although the first rotating shaft 230 may slide leftward and rightward, the forward and rearward movement or rotation of the first rotating shaft 230 within the first shaft mounting portion 221 may be prohibited.

The sliding portion 232 may centrally have a recessed portion 233 formed in an outer surface thereof so as to allow the user to push the sliding portion 232 in a given direction through the shaft movement hole 222. The recessed portion 233 is formed at the center of the sliding portion 232 so as to have a prescribed depth and width. Although FIG. 6 illustrates the recessed portion 233 as being formed throughout the circumference of the sliding portion 232, the recessed portion 233 may be formed only in a lower surface of the sliding portion 232.

When mounting the support unit 200, the user may push the first rotating shaft 230 from the outside with their finger, so as to insert the first rotating shaft 230 into a shaft hole formed in a left side surface of the opening 121. The shaft movement hole 222 and the recessed portion 233 are unnecessary when mounting the support unit 200.

When removing the mounted support unit 200, the user may push the recessed portion 233 rightward through the shaft movement hole 222 using, for example, a pointed pin so as to push the first rotating shaft 230 such that the first rotating shaft 230 does not protrude from the lower case 220, and then may pull the support unit 200 forward so as to remove the support unit 200.

Explaining the mounting procedure of the support unit 200 again, the user may first insert the second rotating shaft 240, located at the right side of the assembled support unit 200, into the shaft hole at the right side of the opening 121, and then push the first rotating shaft 230 so as not to protrude, and finally insert the first rotating shaft 230 into the shaft hole at the left side of the opening 121, thereby completing the mounting of the support unit 200.

Meanwhile, as exemplarily illustrated in FIG. 6, the support unit 200 may further include an upper plate 260 configured to be mounted in a concave portion 256 formed in an upper surface of the upper case 250. Although the upper surface of the upper case 250 may be a smooth flat surface, the concave portion 256 may be formed in the upper surface of the upper case 250 and the upper plate 260 in the form of a rectangular plate may be mounted in the concave portion 256, which may provide more aesthetically pleasant outer appearance. In addition, as the upper plate 260 is formed of a different material from a material of the upper case 250, shock applied by an object seated thereon may be more efficiently absorbed, and increased friction may be provided to prevent the object from easily sliding thereon.

A plurality of reinforcement grooves 258 may be formed in the central region of the concave portion 256 of the upper case 250. The reinforcement grooves 258 may take the form of elongated straight lines extending in a left-and-right direction. When viewing the upper case 250 from the bottom side, the reinforcement grooves 258 protrude downward. The upper case 250, which is mainly formed of a synthetic resin, may have no risk of extreme deformation or damage thereof even if a very heavy object is disposed thereon owing to the vertically extending rim portion thereof as well as the reinforcement grooves 258.

Although the rotating shafts of the support unit 200 may be directly mounted in the shaft holes formed in the inner side surfaces of the main door 120 at the lower end of the opening 121, as exemplarily illustrated in FIG. 6, a separate mounting member 210 (a mount) may be mounted at the lower end of the opening 121 formed in the main door 120 and the support unit 200 may be mounted on the mounting member 210. The lower end of the opening 121 may be provided with a concave portion corresponding to the mounting member 210, and the mounting member 210 may be inserted into and mounted in the concave portion.

The mounting member 210 may be provided in a front lower portion thereof with a plurality of coupling recesses 211 to allow the mounting member 210 to be mounted at the lower end of the opening 121. Correspondingly, a plurality of coupling bosses may be formed at a front surface of the concave portion of the opening 121 so as to be inserted into and coupled to the coupling recesses 211.

The shaft holes, into which the first rotating shaft 230 and the second rotating shaft 240 of the support unit 200 are inserted respectively, are provided at both sides of the mounting member 210. Since the shaft holes of the mounting member 210 protrude from an outer surface of the mounting member 210 in opposite directions, it may be difficult to mount the mounting member 210 inside the opening 121 having a prescribed width.

A bearing portion 215, which internally defines the shaft hole at the right side of the mounting member 210, may be integrally formed with the mounting member 210. The shaft hole at the left side of the mounting member 210 may be defined in a bearing member 214 which is separately inserted into and coupled to a bearing mounting hole 213 formed in a left side surface.

When the mounting member 210 is mounted at the lower end of the opening 121, the right bearing portion 215 is first inserted in a state in which the bearing member 214 is not yet inserted. Thereafter, the mounting member 210 is moved downward to allow the coupling bosses to be inserted into the coupling recesses 211 formed in a front surface of the mounting member 210. The mounting member 210 may be mounted as it is located in position, and then the bearing member 214 is inserted into the left bearing mounting hole 213.

In addition, the mounting member 210 may include a support rib 218, which supports an upper surface of the support unit 200 when the support unit 200 is vertically oriented, and a bottom surface 217, which supports a lower surface of the support unit 200 when the support unit 200 is horizontally oriented.

When the sub door 130 is closed, the protrusion 137 supports the support unit 200 via the power transmission device 400 so that the support unit 200 remains in the vertically oriented state. As the support rib 218 also supports the upper surface of the vertically oriented support unit 200, it is possible to prevent the support unit 200 from falling backward.

The vertical state does not mean only the state of being erected at exactly 90 degrees in relation to the ground surface. The vertical state may be achieved within a range of 80 to 100 degrees so long as it does not interfere with items received in the auxiliary storage compartment 140 or the rear surface of the sub door 130. When the support unit 200 is horizontally oriented, the lower surface of the support unit 200 may be supported by the bottom surface 217 of the mounting member 210.

The mounting member 210 may be provided with a concave portion or surface 212, which prevents the mounting member 210 from interfering with a rear end of the support unit 200 when the support unit 200 is pivoted. The rear end of the rotating shaft of the support unit 200 is spaced apart from the support unit 200 by a prescribed distance, rather than coming into close contact with the support unit 200. As such, when the support unit 200 is rotated, the rear end of the rotating shaft is pivoted. Hence, the concave portion 212 is configured as an arc-shaped surface having an approximately 90 degrees, so as not to interfere with the support unit 200 during the pivoting of the support unit 200.

The support rib 218 is provided at an upper end of the concave portion 212. A lower surface of the support rib 218 may be configured to support an upper surface of a rear end of the support unit 200 when the support unit 200 is at the horizontally oriented position. In other words, when the support unit 200 is at the horizontally oriented position, the bottom surface 217 supports the lower surface of the support unit 200 and the support rib 218 supports the upper surface of the support unit 200, whereby the mounting member 210 may sufficiently support great load even if a heavy object is placed on the support unit 200.

The power transmission device 400 illustrated in FIG. 6 is coupled to the right end of the second rotating shaft 240. Hereinafter, a detailed configuration of the power transmission device 400 will be described with reference to FIGS. 8A to 11.

The power transmission device 400 may include the case mounted in the recess formed in the main door 120, a slider 430 mounted in the case so as to slide forward and rearward, the slider 430 being provided at a lower surface thereof with a rack 436, and the rotating gear 460 mounted in the case and provided at one side thereof with a pinion 464 to be rotatably engaged with the rack 436 of the slider 430, the rotating gear 460 being connected to the second rotating shaft 240 of the support unit 200.

The case of the power transmission device 400 includes a first case 410 in which the slider 430 is slidably mounted and the rotating gear 460 is rotatably mounted, and a second case 420 coupled to one side surface of the first case 410, one end of the rotating gear 460 being rotatably mounted to the second case 420. In a case where the power transmission device 400 is configured as a single integrated member, it is difficult to assemble complicated components in the interior space of the case. Therefore, two cases may be coupled to each other.

The first case 410 may be provided in an upper surface thereof with a coupling hole 417, and the second case 420 may be provided at an inner side surface thereof with a coupling boss 427 configured to be inserted into the coupling hole 417. The first case 410 may take the form of a rectangular box having an open left side surface, and the second case 420 may be coupled to the left side surface of the first case 410 such that a rim portion thereof extends inward by a prescribed length. The coupling boss 427 may extend from the rim portion of the second case 420.

The rim portion of the second case 420 may have a stepped end so as to be inserted and coupled inside a stepped region of a rim portion of the left side surface of the first case 410. In addition, the first case 410 may be provided at both corners of a lower end thereof with two fastening holes 418 so as to be fastened to the second case 420 using screws. Concave grooves may be horizontally formed next to each fastening hole 418 so as to ensure the easy insertion of screws into the fastening hole 418.

The first case 410 may be provided at the upper surface and the lower surface thereof with the fastening portions 411. Through the fastening portions 411, screws S may be fastened into the two fastening holes formed in the upper and lower portions of the recess formed in the main door 120 after the first case 410 is coupled to the second case 420.

The slider 430 is mounted so as to slide forward and rearward within the first case 410, and the first case 410 may be provided at a front surface thereof with an opening 413 to allow the front side of the slider 430 to protrude forward from the first case 410. The opening 413 needs not be formed in the front surface of the first case 410, but may be formed through the coupling of a recess formed in the second case 420 and a recess formed in the front surface of the first case 410.

The protrusion 431 may be provided at a front surface of the slider 430 so as to protrude forward from the front surface of the slider 30. The protrusion 431 may be deviated leftward on the front surface of the slider 430. The opening 413 needs not be formed in a shape corresponding only to the protrusion 431, but may be formed in a shape corresponding to the entire front surface of the slider 430.

The slider 430 is adapted to move forward and rearward within the first case 410. The distance that the slider 430 moves forward to the maximum extent within the limited interior space of the first case 410 may be considerably increased when the size of the opening 413 is increased. The sliding of the slider 430 is guided by a guide pin 440, which is mounted in the first case 410 so as to penetrate the slider 430.

Guide pin holes 414 may be perforated in the upper center of a front surface and a rear surface of the first case 410 so that the guide pin 440 is inserted through the guide pin holes 414. The slider 430 has a portion upwardly extending from an upper surface thereof, and is provided with a guide pin hole 434 at the upwardly extending portion so that the guide pin 440 passes through the guide pin hole 434.

The guide pin 440 needs not have a simple pin shape, but may include a head portion 444 formed at one end thereof and a screw portion 446 formed around the circumference of the other end. The head portion 444 may have therein a cross-shaped groove like a screw head, and the screw portion 446 may be inserted into and fastened through an inner circumferential surface of the guide pin hole 414 formed in the front surface of the first case 410. The screw portion 446 may have a smaller outer diameter than a diameter of an adjacent portion of the guide pin 440. As such, the guide pin hole 414 formed in the rear surface of the first case 410 may be larger than the guide pin hole 414 formed in the front surface.

When assembling the slider 430 into the first case 410, the slider 430 is first located inside the first case 410, and subsequently the guide pin 440 is inserted through the guide pin hole 414 formed in the rear surface of the first case 410 so as to pass through the guide pin hole 434 of the slider 430, and finally the guide pin 440 is rotated using a screwdriver at the outside. In this way, easy fastening and assembly of the slider 430 may be realized.

The power transmission device 400 may further include an elastic member 450, which is mounted between the slider 430 and the case and is adapted to apply restoration force so as to push the slider 430 forward when the slider 430 is moved rearward. The elastic member 450 may be a spring mounted between the rear surface of the first case 410 and a rear surface of the slider 430.

Since the elastic member 450 flexes greatly according to the movement of the slider 430, it is necessary to cause the elastic member 450 to be flexible only in a given direction and to support the elastic member 450 so that it is not dislodged from a mounting position thereof. Thus, the elastic member 450 may be mounted to each of a pair of mounting pins 452, which are mounted at both sides of the guide pin 440 within the case so as to penetrate the slider 430.

Each of the mounting pins 452 may include a head portion 454 and a screw portion 456, similar to the guide pin 440. The screw portion 456 may be formed adjacent to the head portion 454, rather than being formed at an end of the mounting pin 452 opposite to the head portion 454. The slider 430 may be provided with a pair of mounting pin holes 432 at both sides of the guide pin hole 434 so that ends of the mounting pins 452 are inserted respectively into the mounting pin holes 432.

In addition, the first case 410 may be provided in the front surface and the rear surface thereof with mounting pin holes 415 at both sides of the guide pin hole 414 such that the mounting pins 452 are inserted respectively into the mounting pin holes 415. Since the screw portion 456 of the mounting pin 452 is formed adjacent to the head portion 454, screw threads may be formed at an inner circumferential surface of one of the mounting pin holes 415 which is formed in the rear surface of the first case 410.

The elastic member 450 has a larger inner diameter than those of the mounting pin hole 432 and the mounting pin hole 415. Therefore, when the elastic member 450 is mounted, the elastic member 450 may be flexibly supported between the rear surface of the slider 430 and the rear surface of the first case 410.

In addition, an inner circumferential surface of the guide pin hole 434 of the slider 430 comes into contact with an outer circumferential surface of the guide pin 440 so as to slide thereon, whereas an outer diameter of each mounting pin 452 for the elastic member 450 may be smaller than an inner diameter of the mounting pin hole 432 such that the mounting pin hole 432 does not come into contact with the mounting pin 452.

In a case where the slider 430 is slidably supported while coming into contact with the three pins, the slider 430 may have difficulty in moving smoothly due to a large amount of friction. This is because the flexible motion of the elastic member 450 may be hindered when the mounting pin holes 432 come into contact with the mounting pins 452.

In addition, since a pair of elastic members 450 is mounted at both sides of the guide pin 440, a spring having a lower coefficient of elasticity may be used compared to a case where a single elastic member 450 is used. In addition, despite the fact that the slider 430 has a horizontally asymmetrical shape, it is possible to prevent the slider 430 from being distorted when the elastic member 450 pushes the slider 430.

Meanwhile, the second rotating shaft 240 of the support unit 200 is connected so as to rotate along with the rotating gear 460 which is rotatably mounted below the slider 430 within the first case 410. To this end, the right end of the second rotating shaft 240 does not have a cylindrical shape, but is shaped such that the circumference of a cylinder is cut by planes on both sides, and a shaft connection groove 462 may be formed inside the left side of the rotating gear 460 and may have a shape corresponding to the right end of the second rotating shaft 240.

In order to rotatably support the rotating gear 460, the first case 420 may have a mounting hole 426 into which a left end of the rotating gear 460 is inserted. In addition, the right end of the rotating gear 460 may be supported by a shaft screw 480, which is inserted and fastened into a screw fastening hole 468 formed in the center of the right end such that an end of the shaft screw 480 is inserted and supported in a shaft support recess formed in a right inner surface of the first case 410.

The shaft screw 480 may include a head portion 484 configured to be inserted inside the rotating gear 460, and a screw portion 486 formed in a circumferential surface adjacent to the head portion 484. The screw fastening hole 468 of the rotating gear 460 may be formed at an inner circumferential surface thereof with screw threads so as to correspond to the screw portion 486 of the shaft screw 480.

In addition, the rotating gear 460 may be provided at an outer circumferential surface thereof with the pinion 464 within a prescribed range so as to be gear-engaged with the rack 436 formed at the lower surface of the slider 430. The rack 436 is formed at a lower surface of a portion extending downward from the lower surface of the slider 430, and may have an appropriate length selected in consideration of the distance that the slider 430 moves forward and rearward and the engagement between the rack 436 and the pinion 464. The pinion 464 may be formed at an angle of approximately 120 degrees in relation to the center, in consideration of the size of the rotating gear 460 and the distance that the slider 430 moves forward and rearward.

When the user pushes the sub door 130 in a closing direction, the protrusion 137 formed at the rear surface of the sub door 130 pushes the protrusion 431 so as to move the slider 430 rearward. For smooth contact and relative motion between the protrusion 137 of the sub door 130 and the protrusion 431 of the slider 430, the protrusion 137 of the sub door 130 may include a slanted rear surface, a side surface, and a rounded corner connected between the rear surface and the side surface.

At this time, the rack 436 of the slider 430 rotates the pinion 464 of the rotating gear 460, and simultaneously, the second rotating shaft 240 of the support unit 200 connected to the rotating gear 460 is rotated. As the second rotating shaft 240 is rotated, the support unit 200 is pivoted so as to be vertically oriented.

When the user pulls the closed sub door 130 to open the sub door 130, the protrusion 137 that is pushing the protrusion 431 retreats. At this time, the elastic member 450, which has been contracted, is stretched to push the slider 430 forward. Accordingly, the rack 436 of the slider 430 rotates the pinion 464 of the rotating gear 460, thereby causing the support unit 200 to be pivoted downward.

Meanwhile, once the support unit 200 has been pivoted forward and downward from the vertically oriented position, the support unit 200 is more rapidly pivoted downward by the weight thereof in addition to the elastic force of the elastic member 450 because the center of weight of the support unit 200 is located in front of the rotating shafts.

Subsequently, at the horizontally oriented position of the support unit 200, at the time when the lower surface of the support unit 200 is supported by the bottom surface 217 and the upper surface of the support unit 200 is supported by the rear support rib 218, a region around the rotating shafts of the support unit 200 may be damaged when it is subjected to shocks. Hence, the power transmission device 400 may further include a damper 500, which is mounted in the case and causes the support unit 200 to be slowly moved downward when the sub door 130 is opened.

The damper 500 may be mounted at the right side of the slider 430 within the first case 410. The slider 430 is configured so as not to interfere with the damper 500 while moving forward and rearward. To this end, the guide pin hole 434 and the mounting pin holes 432 of the slider 430 are formed at the upwardly extending portion of the slider 430, rather than being formed at the middle height of the slider 430.

Figure 12:
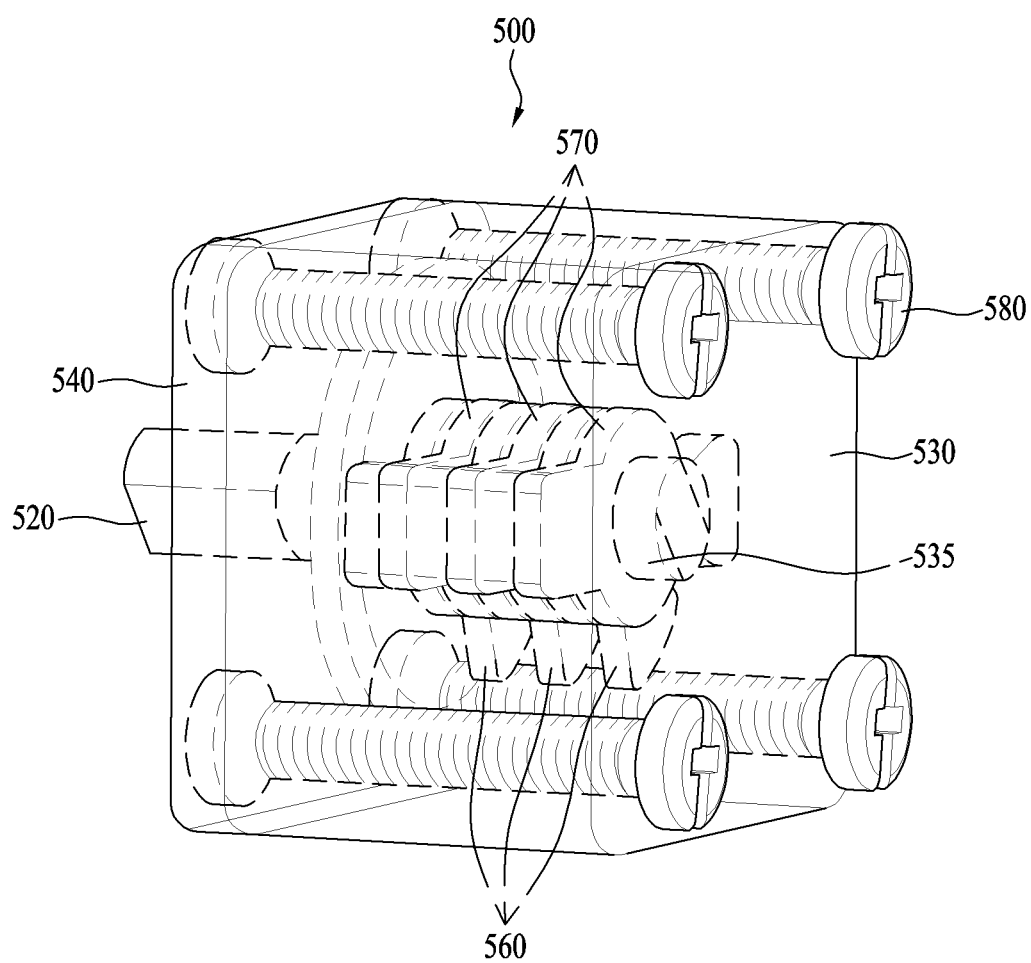
FIG. 12 is a perspective view illustrating the interior of a damper.
Figure 13:
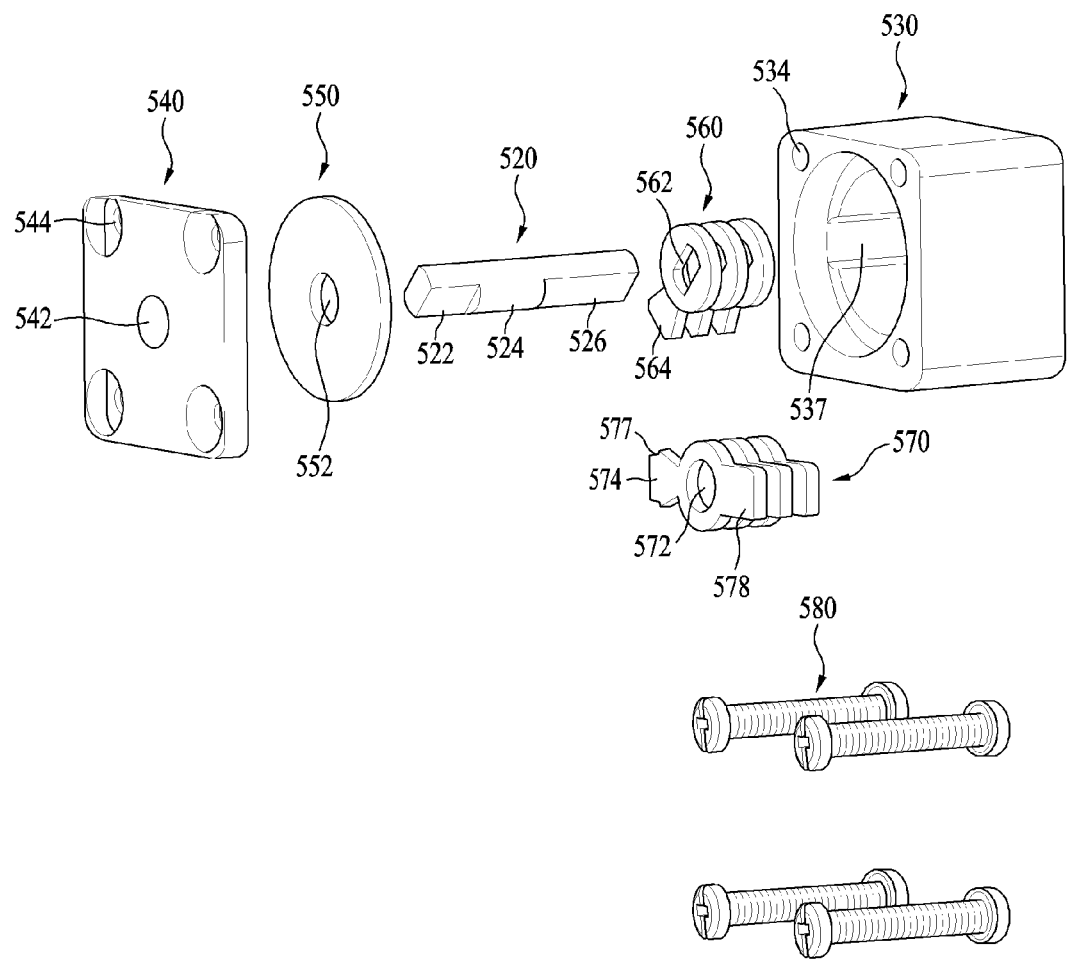
FIG. 13 is an exploded perspective view illustrating the damper.

A detailed configuration and operation of the damper 500 will be described with reference to FIGS. 12 and 13. The damper 500 may include a case 530, which internally defines a hermetically sealed space into which a hydraulic fluid is introduced, a pivot shaft 520, which is rotatably mounted in the case 530 and has an outwardly protruding end, a plurality of rotating members 560, which is mounted around the pivot shaft 520 at a prescribed interval so as to be rotated along with the pivot shaft 520, and a plurality of stationary members 570, which is mounted between the rotating members 560 and is supported at one side thereof by an inner surface of the case 530 so as not to be rotated.

The case 530 is open at the left side thereof and internally defines a cylindrical space. A cover 540 is coupled to the left side of the case 530 and hermetically seals the inner space of the case 530. The hydraulic fluid having high viscosity is introduced into the space defined inside the case 530 and the cover 540. The case 530 and the cover 540 may be fastened to each other by a plurality of fastening members 580 such that the hermetically sealed space endures the high pressure of the hydraulic fluid.

To this end, fastening holes 534 may be perforated in four corner regions of the case 530, and fastening holes 544 may be perforated in four corner regions of the cover 540. Although each of the fastening members 580 is illustrated as a single member, it may consist of a bolt and a nut.

A middle portion of the pivot shaft 520 is located in a shaft hole 542 formed in the center of the cover 540 such that a left portion of the pivot shaft 520 protrudes outward. A right end of the pivot shaft 520 is inserted into and rotatably supported by a shaft support recess 535 formed in an inner side surface of the case 530.

The pivot shaft 520 may include a cylindrical portion 524, which is supported by the shaft hole 542, a protruding portion 522, which extends leftward from the cylindrical portion 524 and protrudes outward from the cover 540, and a rotating portion 526, which extends rightward from the cylindrical portion 524, the rotating members 560 and the stationary members 570 being mounted at the rotating portion 526.

A driven gear 510, which is illustrated in FIGS. 9A to 11, is mounted at the protruding portion 522 so as to be rotated along with the protruding portion 522. Each of the protruding portion 522 and the rotating portion 526 is formed at both sides of an outer circumferential surface thereof with cutouts, which are cut in a plane, so as to be rotated along with components mounted thereon.

Each of the rotating members 560 is centrally formed with a shaft hole 562, which has a shape corresponding to the cross section of the rotating portion 526, and is rotated when the pivot shaft 520 is rotated. On the other hand, a shaft hole 572, formed in the center of each of the stationary members 570, simply has a circular shape, and remains stationary even if the pivot shaft 520 is rotated.

Each of the rotating members 560 is formed at one side thereof with an extension 564 to cause the flow of the hydraulic fluid during rotation thereof. The extension 564 is gradually increased in width with increasing distance from the center of the rotating member 560 and is then gradually reduced in width with decreasing distance to a distal end thereof.

Although the extension 564 may extend to come into contact with an inner circumferential surface of the case 530, the inner circumferential surface of the case 530 has a cylindrical shape and an end of the extension 564 has a radius equal to or smaller than a radius of the inner circumferential surface of the case 530. Therefore, the rotation of the rotating member 560 is not prevented by the inner circumferential surface of the case 530.

Each of the stationary members 570 may be provided with a pair of extensions in opposite directions. Specifically, a first extension 574 and a second extension 578 may be formed at opposite sides. The first extension 574 may have the same shape as the extension 564 of the rotating member 560 and is additionally provided with a protruding stopper 577.

The second extension 578 may have the same width overall, and a radius thereof from the center to the end is greater than the radius of the inner circumferential surface of the case 530.

In addition, stopper recesses 537 are formed in opposite sides of the inner circumferential surface of the case 530 such that the protruding stopper 577 and the distal end of the second extension 578 are inserted into and supported by the stopper recesses 537. Since the stationary member 570 is mounted such that the protruding stopper 577 of the first extension 574 and the distal end of the second extension 578 are inserted into the stopper recesses 537 respectively, the stationary member 570 may remain stationary rather than being rotated even if friction is applied to the shaft hole 572 by the pivot shaft 520 that is being rotated.

A process of transmitting torque of the rotating gear 460 to the pivot shaft 520 of the damper 500 will be described with reference to FIGS. 8 to 11. Although the driven gear 510 mounted on the pivot shaft 520 may be rotatably connected to the rotating gear 460 via a gear integrally formed at the side of the pinion 464, in this case, the rotating gear 460 has an excessively complicated configuration and the manufacturing of the rotating gear 460 by injection molding may be difficult.

Thus, a damper driving gear 470 is manufactured separately from the rotating gear 460 and is coupled to the rotating gear 460 so as to be rotated along with the rotating gear 460, thereby serving to rotate the driven gear 510. The damper driving gear 470 may be formed at an outer circumferential surface thereof with a gear portion 474 having an angle similar to that of the rotating gear 460.

The radius of the gear portion 474 of the damper driving gear 470 is about two times that of the driven gear 510, and may rotate the pivot shaft 520 connected to the driven gear 510 at a large angle even if the damper driving gear 470 is pivoted at a small angle. The damper driving gear 470 is centrally provided with a shaft hole 478, through which the shaft screw 480 passes.

The damper driving gear 470 is rotatably mounted on and supported relative to the shaft screw 480. The damper driving gear 470 is connected to the rotating gear 460. To this end, a pair of bosses 477 is formed near the shaft hole 478 of the damper driving gear 470 so as to protrude laterally, and a pair of recesses 467, into which the bosses 477 are inserted, is formed in a right surface of the rotating gear 460.

In addition, a pair of fastening holes 479 is perforated near the shaft hole 478 of the damper driving gear 470, and correspondingly, a pair of fastening holes 479 is also perforated in a side surface of the rotating gear 460. Each fastening hole 479 of the damper driving gear 470 may be formed with a stepped recess to allow a head portion of a coupling screw 490 to be inserted.

The gear portion 474 of the damper driving gear 470 may have a greater gear radius than the pinion 464 of the rotating gear 460. Since the radius of the gear portion 474 is greater than the radius of the pinion 464, the damper driving gear 470 may rotate the pivot shaft 520 and the driven gear 510 by a greater angle even if it is rotated at the same angle as the rotating gear 460.

As the pivot shaft 520 of the damper 500 is rotated, the pivot shaft 520 acts as a resistor to attenuate the rotation of the rotating gear 460 by the flow resistance of the hydraulic fluid inside the damper 500. In particular, when the rotating gear 460 is rotated in a direction in which the support unit 200 is moved downward, damping force may be applied to the rotating gear 460, thereby alleviating shocks applied to the rotating shafts of the support unit 200.

The damper 500 may further include a bearing disc 550, which is mounted to slide on the inner side surface of the cover 540 and the inner circumferential surface of the case 530 and is configured to support the pivot shaft 520. The bearing disc 550 takes the form of a circular disc and is centrally provided with a circular shaft hole 552, through which the pivot shaft 520 passes. The bearing disc 550 comes into contact with a side surface of a leftmost rotating member 560 among the rotating members 560, thereby rotatably supporting the corresponding rotating member 560.

The bearing disc 550 is rotatably mounted on the inner circumferential surface of the case 530 and slidably comes into contact with the inner side surface of the cover 540. To this end, the bearing disc 550 may be formed of a material having low friction with respect to the inner side surface of the cover 540.

It is necessary to seal the interior of the damper 500 in order to prevent the leakage of the hydraulic fluid. Since the pivot shaft 520 and the rotating members 560 are rotated within the damper 500, the leakage of the hydraulic fluid may occur when a gap is present between the pivot shaft 520 and the shaft hole 542 of the cover 540, and the pivot shaft 520 may have difficulty in pivoting due to a large amount of friction when the pivot shaft 520 is mounted by interference fit in order to prevent the generation of the gap. Therefore, additionally mounting the bearing disc 550 inside the cover 540 may accomplish sealing as well as smooth rotation.

In this case, the shaft hole 542 of the cover 540 is configured to allow the pivot shaft 520 to be slightly loosely inserted thereinto, whereas the shaft hole 522 of the bearing disc 550 may be formed to allow the pivot shaft 520 to be inserted therein by interference fit in order to prevent a gap between the shaft hole 522 and the pivot shaft 520. Although the bearing disc 550 may be rotated along with the pivot shaft 520, both the smooth rotation of the rotating components and the sealing of the hydraulic fluid may be accomplished because the bearing disc 550 is rotatably mounted at the inner circumferential surface of the case 530 and comes into close contact with the inner circumferential surface of the cover 540.

Figure 14:
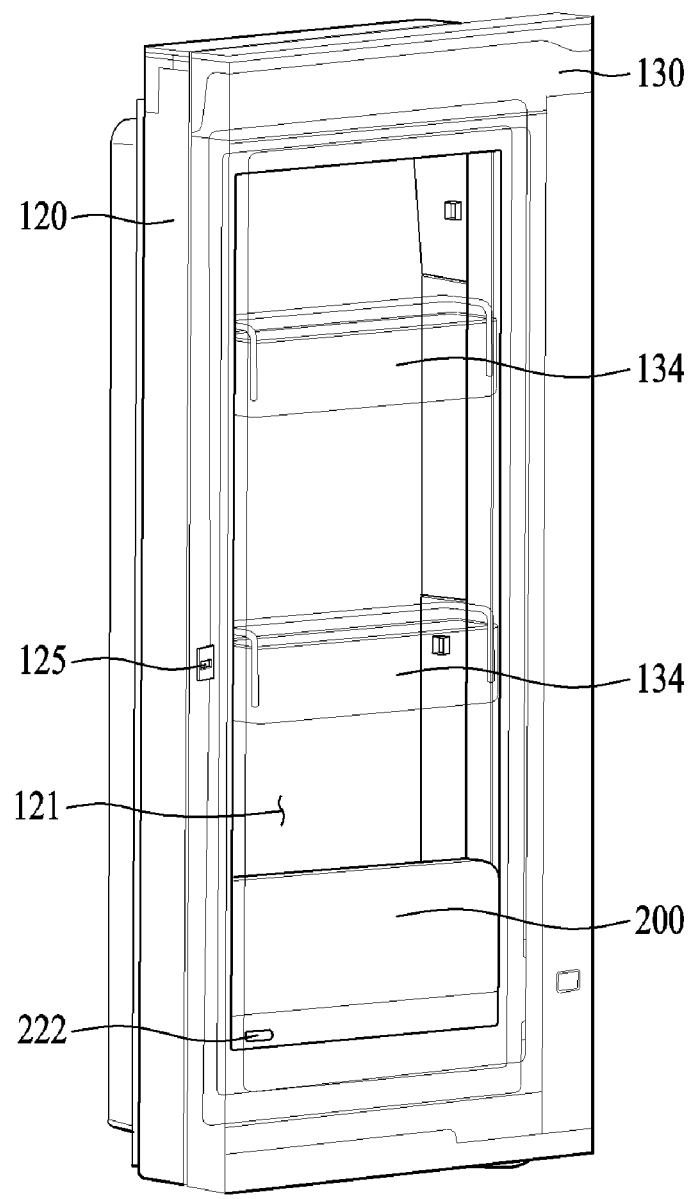
FIG. 14 is a perspective view illustrating the interior of the sub door and the main door in a closed state thereof.
Figure 15A:
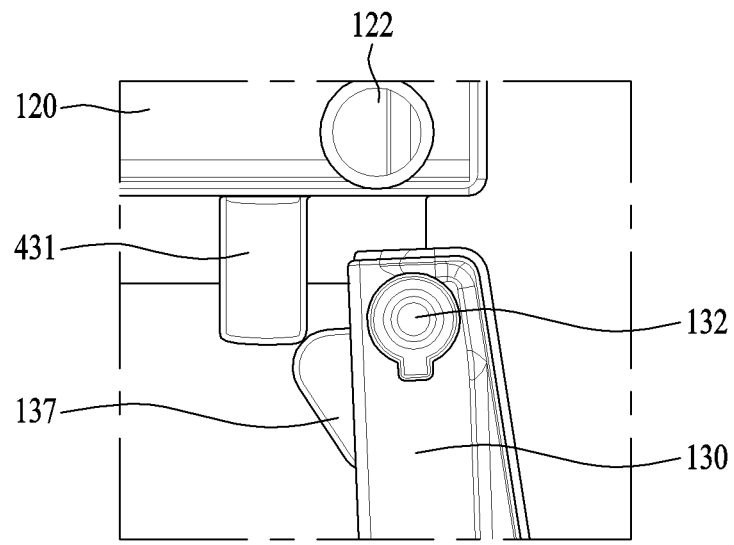
FIGS. 15A to 15C are plan views illustrating a state in which a protrusion of the main door pushes and operates a slider of the power transmission device as the main door is closed.
Figure 15B:
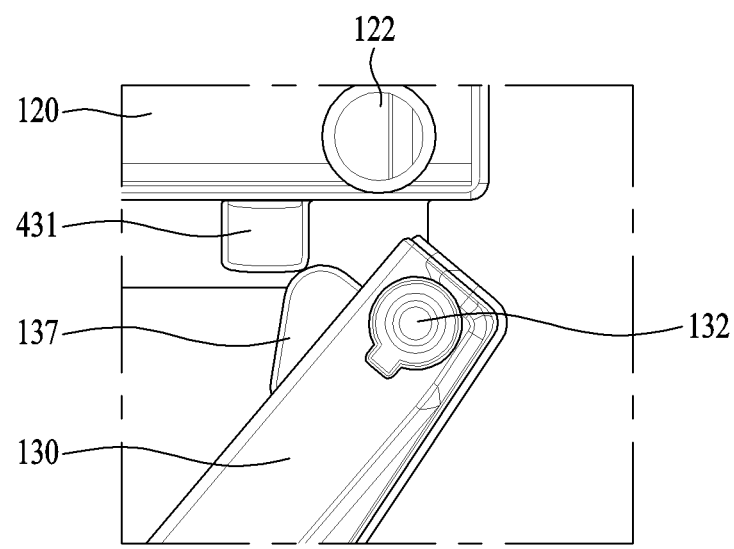
Figure 15C:
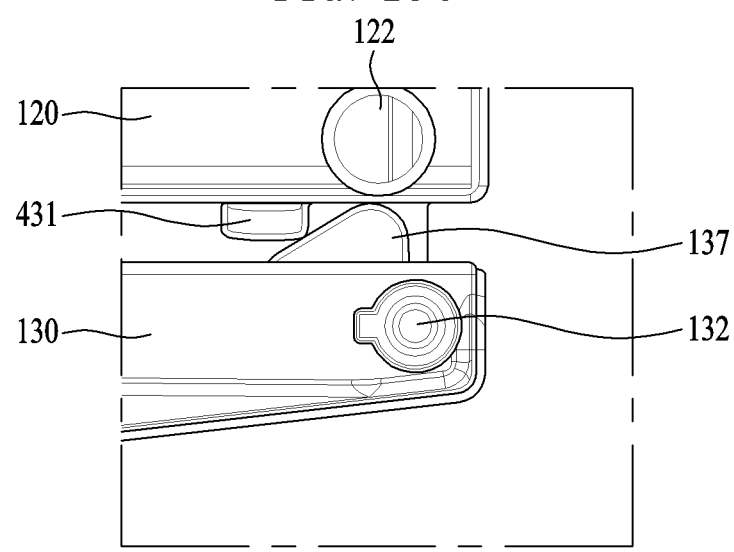

FIG. 14 is a perspective view illustrating the interior of the sub door and the main door in a closed state thereof. FIGS. 15A to 15C are plan views illustrating a state in which the protrusion of the main door pushes and operates the slider of the power transmission device as the main door is closed.

When the opened sub door 130 is closed, as exemplarily illustrated in FIG. 15A, the protrusion 137 begins to come into contact with the protrusion 431 so as to push the protrusion 431 at a point in time at which the sub door 130 is oriented at approximately 90 degrees in relation to the main door 120. At this time, the support unit 200 begins to be pivoted upward by the power transmission device 400.

Subsequently, when the sub door 130 is continuously pivoted, as exemplarily illustrated in FIG. 15B, the protrusion 137 pushes the protrusion 431 so as to move the protrusion 431 rearward. Thereby, as the slider 430 rotates the rotating gear 460, the second rotating shaft 240 connected to the rotating gear 460 is pivoted, thus causing the support unit 200 to be pivoted upward.

As exemplarily illustrated in FIG. 15C, when the sub door 130 is completely closed, the protrusion 137 pushes the protrusion 431 so as to completely introduce the protrusion 431, and the support unit 200 remains in a substantially vertically oriented state. At this time, the support unit 200, as described above, is supported at the upper surface thereof by the rear support rib 218 so as to be no longer pivoted rearward.

Meanwhile, although FIG. 2 illustrates that the support unit 200 is vertically oriented when the sub door 130 is opened, the vertical orientation of the support unit 200 may be accomplished when the sub door 130 is closed as exemplarily illustrated in FIG. 14. FIG. 2 is intended to illustrate the lower surface of the support unit 200 for convenience.

In other words, when the sub door 130 is opened as exemplarily illustrated in FIG. 2, the elastic members 450 of the power transmission device 400 push the slider 430 to return the protrusion 431 so as to protrude, whereby the support unit 200 is pivoted downward. At this time, the damper 500 may alleviate shocks applied to the rotating shafts of the support unit 200 when the support unit 200 is horizontally supported by reducing the pivoting speed of the support unit 200.

As described above, when a user opens a sub door and retrieves food from an auxiliary storage compartment, the user can put the food directly on a support unit provided below an opening of the main door without requiring to move the food to another place such as, for example, a table, which may make it very convenient to use the refrigerator.

Since the support unit is pivoted in linkage with the sub door so as to be vertically oriented when the sub door is closed and to be automatically pivoted to a horizontally oriented state when the sub door is opened, the user may more conveniently use the refrigerator without requiring the support unit to be pivoted upward or downward by hand when opening or closing the sub door.

A power transmission device provided inside a main door is mounted at a rear surface of the main door such that only a protrusion of a slider of the power transmission device protrudes from a front surface of the main door and the remainder is hidden. Thereby, the power transmission device is hardly exposed to the front surface of the main door, which may avoid marring the outer appearance of the refrigerator.

As the power transmission device is configured so as to be inserted into a mounting recess formed in the rear surface of the main door and a gasket is mounted after the mounting recess is covered with a cover, it is possible to avoid marring the outer appearance of the rear surface, which is visible, when the main door is opened.

The power transmission device, which transmits the pivoting force of the sub door to a rotating shaft of the support unit so as to cause the rotating shaft to be pivoted in a different direction, is provided with a damper. Through the provision of the damper, it is possible to alleviate shocks applied when the support unit is pivoted and moved downward by reducing the pivoting speed of the support unit, thereby preventing damage to a region at which the rotating shaft of the support unit is mounted.

Although a pair of rotating shafts protrudes from both side surfaces of the support unit in opposite directions, one rotating shaft is axially movably mounted within the support unit, and therefore may be easily mounted between inner side surfaces of an opening formed in the main door.

The present disclosure relates to a refrigerator, in which a support unit is provided in an opening formed in a main door and is configured to be pivotable between a horizontally oriented position and a vertically oriented position in linkage with the pivoting of a sub door, so as to assist a user in supporting retrieved foods, resulting in improved convenience of use.

A refrigerator may include a cabinet having a storage compartment, a main door pivotably mounted to the cabinet and configured to open or close the storage compartment, the main door having an opening therein, an auxiliary storage compartment mounted at a rear side of the main door, a sub door pivotably mounted to the main door and configured to open or close the opening so as to enable access to the auxiliary storage compartment, a support unit having a rotating shaft pivotably mounted at a lower portion of the opening of the main door, a case mounted in a recess formed in the main door, a slider mounted in the case so as to be slidable forward and rearward and provided at a lower surface thereof with a rack, the slider being moved rearward by the sub door, and a rotating gear mounted in the case and provided at a circumferential surface thereof with a pinion configured to be engaged and rotated with the rack of the slider, the rotating gear being connected to the rotating shaft of the support unit, wherein the support unit is rotated to be vertically oriented when the sub door is closed, and is rotated to be horizontally oriented when the sub door is opened.

The support unit may include a plate having a rectangular shape, and a first rotating shaft and a second rotating shaft laterally protruding respectively from both side surfaces of the plate.

The refrigerator may further include a guide pin secured to the case in a front-and-rear direction and mounted to penetrate the slider so as to guide movement of the slider.

The slider may further include a protrusion configured to protrude forward from the case when the support unit is moved downward, and the case may be provided in a front surface thereof with an opening for passage of the protrusion.

The sub door may include a protrusion formed at a rear surface thereof so as to push the protrusion of the slider when the sub door is pivoted to be closed.

The protrusion of the sub door may comprise a slanted rear surface, a side surface, and a rounded corner connected between the rear surface and the side surface.

The refrigerator may further include an elastic member mounted between the slider and the case and configured to apply restoration force required to push the slider forward when the slider is moved rearward.

The elastic member may be mounted on each of a pair of mounting pins, the mounting pins being respectively mounted at both sides of the guide pin within the case so as to penetrate the slider.

The support unit may include a lower case provided at both side portions thereof with a first shaft mounting portion and a second shaft mounting portion configured to receive the first rotating shaft and the second rotating shaft respectively, and an upper case coupled to the top of the lower case.

The support unit may further include an elastic member mounted between one side of the first shaft mounting portion and the first rotating shaft and configured to apply restoration force in a direction in which the first rotating shaft protrudes.

The first rotating shaft may include a shaft portion configured to selectively protrude from one side surface of the support unit and a sliding portion slidably mounted in the first shaft mounting portion.

The first shaft mounting portion may be provided in a lower surface thereof with a shaft movement hole such that the first rotating shaft movably penetrates the shaft movement hole when the first rotating shaft is mounted, and the sliding portion may include a recessed portion formed in an outer surface thereof to allow a user to push the sliding portion in a given direction through the shaft movement hole.

The refrigerator may further include a mounting member mounted at a lower end of the opening formed in the main door and having shaft holes for insertion of the first rotating shaft and the second rotating shaft of the support unit, the mounting member supporting the support unit at a vertically oriented position and at a horizontally oriented position.

The mounting member may include a support rib configured to support an upper surface of the support unit when the support unit is at the vertically oriented position, and a bottom surface configured to support a lower surface of the support unit when the support unit is at the horizontally oriented position.

The mounting member may be provided with a concave portion to prevent the mounting member from interfering with a rear end of the support unit when the support unit is pivoted.

The refrigerator may further include a damper mounted in the case and configured to allow the support unit to be slowly moved downward when the sub door is opened.

The damper may include a case having a hermetically sealed inner space for introduction of hydraulic fluid, a pivot shaft rotatably mounted in the case such that one end thereof protrudes outward, a plurality of rotating members mounted on the pivot shaft so as to be spaced apart from one another by a prescribed distance, the rotating members being rotated along with the pivot shaft, and a plurality of stationary members mounted between the rotating members such that one side of each stationary member is supported by an inner surface of the case so as not to be rotated.

The damper may further include a damper driving gear coupled to the rotating gear so as to be rotated along with the rotating gear, and a driven gear configured to be rotated by the damper driving gear and mounted at one end of the pivot shaft. The damper driving gear may have a greater radius than a radius of the rotating gear.

The damper may include a cover coupled to an open side of the case by a plurality of fastening members, and a bearing disc slidably mounted on an inner side surface of the cover and an inner circumferential surface of the case and configured to support the pivot shaft.

The main door may include a mounting recess formed in an edge of the rear surface thereof such that the case is inserted into and mounted in the mounting recess, and a cover configured to cover the mounting recess.

A shaft hole for insertion of the second rotating shaft may be perforated in a wall surface between the opening formed in the main door and a side surface of the mounting recess.

The main door may be provided with a through-hole in a front surface of the mounting recess such that the protrusion passes through the through-hole.

The mounting recess may further include a housing having an open rear side such that the case is inserted into and mounted in the housing.

The main door may be provided along an edge of the rear surface thereof with a gasket groove for mounting of a gasket, and the cover may be provided with a gasket groove connected to the gasket groove of the main door for mounting of the gasket.

The housing may be provided with a guide recess cut from a rear end of a side surface thereof to the shaft hole so as to guide an end of the rotating gear when the case is inserted.

The cover may include a first wedge formed at one side end thereof so as to be inserted into and caught by a door dike of the main door in the mounting recess, and a second wedge protruding outward from an opposite side surface of the cover so as to be inserted into a retaining recess formed in an inner side surface of the main door in the mounting recess. The second wedge may have an inclined lower surface.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator comprising:
   a cabinet having a storage compartment;
   a main door pivotably mounted to the cabinet to allow access to the storage compartment, the main door having an opening for an auxiliary storage compartment within the main door;
   a sub door pivotably mounted to the main door to enable access to the auxiliary storage compartment;
   a support shelf having at least one rotating shaft pivotably mounted at a lower part of the opening of the main door;
   a case mounted in a recess formed in the main door, the case having an opening through which a slider is configured to slide forward and rearward; and
   a rotating gear provided with a pinion at a circumferential surface and coupled to the at least one rotating shaft of the support shelf,
   wherein the slider includes a rack engaged with the pinion such that a movement of the sub door to close the auxiliary storage compartment rotates the support shelf to a vertical position, and a movement of the sub door to open the auxiliary storage compartment rotates the support shelf to a horizontal position.

2. The refrigerator according to claim 1, wherein the support shelf comprises:
   a shelf having a rectangular shape; and
   at least one rotating shaft includes a first rotating shaft and a second rotating shaft laterally protruding respectively from both side surfaces of the shelf, wherein the rotating gear is coupled to the second rotating shaft.

3. The refrigerator according to claim 2, further comprising a guide pin secured to the case in a front-and-rear direction and mounted to penetrate the slider so as to guide movement of the slider.

4. The refrigerator according to claim 2, wherein the opening of the case is provided at a front surface of the case, and the slider includes a protrusion protrudes through the opening when the support shelf is moved to the horizontal orientation.

5. The refrigerator according to claim 4, wherein the sub door comprises a protrusion formed at a rear surface thereof so as to push the protrusion of the slider when the sub door is pivoted to close the auxiliary storage compartment.

6. The refrigerator according to claim 5, wherein the protrusion of the sub door comprises a slanted rear surface, a side surface, and a rounded corner connected between the rear surface and the side surface.

7. The refrigerator according to claim 3, further comprising at least one elastic spring configured to apply restoration force to push the slider forward when the slider is moved rearward.

8. The refrigerator according to claim 7, wherein the case further includes first and second mounting pins, one end of each first and second mounting pins secured to the case and other end of each first and second mounting pins penetrating the slider, and the at least one elastic spring includes first and second springs provided around the first and second mounting pins, respectively, the guide pin being provided between the first and second mounting pins.

9. The refrigerator according to claim 2, wherein the shelf of the support shelf comprises:
   a first case having a first shaft mounting guide at a first side and a second shaft mounting guide at a second side, the first and second shaft mounting guide being configured to receive the first rotating shaft and the second rotating shaft, respectively, the first and second sides being opposite sides; and
a second case coupled to the first case.

10. The refrigerator according to claim 9, wherein the support shelf further includes an elastic spring provided between one side of the first shaft mounting guide and the first rotating shaft and configured to apply restoration force in a direction in which the first rotating shaft protrudes through the first side of the first case.

11. The refrigerator according to claim 10, wherein the first rotating shaft comprises a shaft portion configured to selectively protrude from a side surface of the first side and a sliding portion slidably mounted in the first shaft mounting guide.

12. The refrigerator according to claim 11, wherein the first shaft mounting guide includes a lower surface with a shaft movement hole such that the first rotating shaft movably penetrates the shaft movement hole when the first rotating shaft is mounted, and
wherein the sliding portion includes an outer surface with a recess to allow a user to push the sliding portion in a prescribed direction through the shaft movement hole.

13. The refrigerator according to claim 2, further comprising a mount provided at a lower end of the opening formed in the main door and having shaft holes to receive the first rotating shaft and the second rotating shaft of the support shelf, the mount supporting the support shelf at the vertical position and at the horizontal position.

14. The refrigerator according to claim 13, wherein the mount includes a support rib configured to support an upper surface of the support shelf at the vertical position, and a bottom surface configured to support a lower surface of the support shelf at the horizontal position.

15. The refrigerator according to claim 14, wherein the mount is provided with a concave surface to prevent the mount from interfering with a rear end of the support shelf when the support shelf is pivoted.

16. The refrigerator according to claim 1, further comprising a damper mounted in the case and configured to allow the support shelf to gradually moved downward when the sub door is opened.

17. The refrigerator according to claim 16, wherein the damper comprises:
a case having an inner space to store hydraulic fluid;
a pivot shaft rotatably mounted in the case such that one end thereof protrudes outward;
a plurality of rotating members mounted on the pivot shaft so as to be spaced apart from one another by a prescribed distance, the rotating members being rotated along with the pivot shaft, and
a plurality of stationary members mounted between the rotating members such that one side of each stationary member is supported by an inner surface of the case to prevent rotation of the stationary members.

18. The refrigerator according to claim 17, wherein the damper further comprises:
a damper driving gear coupled to the rotating gear so as to be rotated along with the rotating gear; and
a driven gear configured to be rotated by the damper driving gear and mounted at one end of the pivot shaft.

19. The refrigerator according to claim 18, wherein the damper driving gear has a greater radius than a radius of the rotating gear.

20. The refrigerator according to claim 19, wherein the damper further comprises:
a cover coupled to an open side of the case by a plurality of fastening members; and
a bearing disc slidably mounted on an inner side surface of the cover and an inner circumferential surface of the case and configured to support the pivot shaft.

21. The refrigerator according to claim 4, wherein the main door includes:
a mounting recess formed at an edge of the opening defining the auxiliary storage compartment such that the case is mounted in the mounting recess; and
a cover configured to cover the mounting recess.

22. The refrigerator according to claim 21, wherein a shaft hole for insertion of the second rotating shaft is perforated in a wall surface between the opening formed in the main door and a side surface of the mounting recess.

23. The refrigerator according to claim 22, wherein the main door is provided with a through-hole in a front surface of the mounting recess such that the protrusion passes through the through-hole.

24. The refrigerator according to claim 22, wherein the mounting recess further comprises a housing having an open rear side.

25. The refrigerator according to claim 24, wherein the main door is provided along an edge of a rear surface thereof with a gasket groove for mounting of a gasket, and
wherein the cover is provided with a gasket groove connected to the gasket groove of the main door for mounting of the gasket.

26. The refrigerator according to claim 24, wherein the housing is provided with a guide recess cut from a rear end of a side surface thereof to the shaft hole so as to guide an end of the rotating gear when the case is inserted.

27. The refrigerator according to claim 25, wherein the cover comprises:
a first wedge formed at one side end thereof so as to be inserted into and caught by a door dike of the main door in the mounting recess; and
a second wedge protruding outward from an opposite side surface of the cover so as to be inserted into a retaining recess formed in an inner side surface of the main door in the mounting recess.

28. The refrigerator according to claim 27, wherein the second wedge has an inclined lower surface.

* * * * *